United States Patent
Sakai et al.

(10) Patent No.: US 10,675,714 B2
(45) Date of Patent: Jun. 9, 2020

(54) GRAIN-ORIENTED ELECTRICAL STEEL SHEET

(71) Applicant: NIPPON STEEL & SUMITOMO METAL CORPORATION, Tokyo (JP)

(72) Inventors: Tatsuhiko Sakai, Oita (JP); Hideyuki Hamamura, Futtsu (JP); Hisashi Mogi, Yachiyo (JP); Fumiaki Takahashi, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 329 days.

(21) Appl. No.: 15/560,454

(22) PCT Filed: Apr. 19, 2016

(86) PCT No.: PCT/JP2016/062376
§ 371 (c)(1),
(2) Date: Sep. 21, 2017

(87) PCT Pub. No.: WO2016/171130
PCT Pub. Date: Oct. 27, 2016

(65) Prior Publication Data
US 2018/0071869 A1    Mar. 15, 2018

(30) Foreign Application Priority Data
Apr. 20, 2015    (JP) .................................. 2015-086300

(51) Int. Cl.
*B23K 26/364*    (2014.01)
*C22C 38/60*    (2006.01)
(Continued)

(52) U.S. Cl.
CPC .............. *B23K 26/364* (2015.10); *C21D 8/12* (2013.01); *C21D 8/1283* (2013.01);
(Continued)

(58) Field of Classification Search
CPC ................. B23K 26/364; C21D 10/005; C21D 2201/05; C21D 2211/004; C21D 8/12;
(Continued)

(56) References Cited

U.S. PATENT DOCUMENTS

| | | |
|---|---|---|
| 5,393,355 A | 2/1995 | Nakano et al. |
| 2012/0028069 A1 | 2/2012 | Sakai et al. |

(Continued)

FOREIGN PATENT DOCUMENTS

| | | |
|---|---|---|
| CN | 101979676 A | 2/2011 |
| CN | 102341511 A | 2/2012 |

(Continued)

OTHER PUBLICATIONS

Japanese Information Statement for counterpart Japanese Application No. 2017-514133, dated Oct. 9, 2018, with English translation.

(Continued)

*Primary Examiner* — Jenny R Wu
(74) *Attorney, Agent, or Firm* — Birch, Stewart, Kolasch & Birch, LLP

(57) ABSTRACT

Provided is a grain-oriented electrical steel sheet including a steel sheet having a steel sheet surface in which a groove, which extends in a direction intersecting a rolling direction and of which a groove depth direction matches a sheet thickness direction, is formed. An average depth D of the groove is greater than 10 μm and equal to or less than 40 μm in a case where the groove is seen on a groove-width-direction cross-section that is perpendicular to a groove extension direction, when a center of the groove in the groove width direction is defined as a groove width center, a deepest portion of the groove deviates from the groove width center toward one side in the groove width direction, and a cross-sectional shape of the groove is asymmetric with respect to the groove width center as a reference in the groove width direction.

4 Claims, 14 Drawing Sheets

(51) Int. Cl.
*H01F 1/16* (2006.01)
*C21D 8/12* (2006.01)
*C22C 38/00* (2006.01)
*C21D 10/00* (2006.01)
*C22C 38/02* (2006.01)

(52) U.S. Cl.
CPC ............ *C21D 10/005* (2013.01); *C22C 38/00* (2013.01); *C22C 38/02* (2013.01); *C22C 38/60* (2013.01); *H01F 1/16* (2013.01); *C21D 2201/05* (2013.01); *C21D 2211/004* (2013.01)

(58) Field of Classification Search
CPC ....... C21D 8/1283; C22C 38/00; C22C 38/02; C22C 38/60; H01F 1/16
See application file for complete search history.

(56) References Cited

U.S. PATENT DOCUMENTS

| | | |
|---|---|---|
| 2013/0017408 A1 | 1/2013 | Sakai et al. |
| 2013/0139932 A1 | 6/2013 | Sakai et al. |
| 2013/0161301 A1 | 6/2013 | Okabe et al. |
| 2014/0106130 A1 | 4/2014 | Sakai et al. |
| 2014/0374137 A1 | 12/2014 | Kwon et al. |
| 2015/0111004 A1 | 4/2015 | Senda et al. |

FOREIGN PATENT DOCUMENTS

| | | | |
|---|---|---|---|
| CN | 102639726 A | | 8/2012 |
| CN | 102834529 A | | 12/2012 |
| CN | 104284994 A | | 1/2015 |
| EP | 2 843 062 A1 | | 3/2015 |
| JP | 50-35679 B | | 11/1975 |
| JP | 57-2252 B2 | | 1/1982 |
| JP | 59-197520 A | | 11/1984 |
| JP | 62-96617 A | | 5/1987 |
| JP | 62-53579 B2 | | 11/1987 |
| JP | 62-54873 B2 | | 11/1987 |
| JP | 63-76819 A | | 4/1988 |
| JP | 5-121224 A | | 5/1993 |
| JP | 6-57335 A | | 3/1994 |
| JP | 9-49024 A | | 2/1997 |
| JP | 2002-292484 A | | 10/2002 |
| JP | 2003-129135 A | | 5/2003 |
| JP | 2003-129138 A | | 5/2003 |
| JP | 2007-2334 A | | 1/2007 |
| JP | 2012-12661 A | | 1/2012 |
| JP | 2012-177164 A | | 9/2012 |
| JP | 2015-510543 A | | 4/2015 |
| KR | 10-2013-0076953 A | | 7/2013 |
| KR | 10-2013-0140220 A | | 12/2013 |
| RU | 2 371 487 C1 | | 10/2009 |
| RU | 2 509 164 C1 | | 3/2014 |
| RU | 2 509 813 C1 | | 3/2014 |
| WO | WO 2012/033197 A1 | | 3/2012 |
| WO | WO 2012/165393 A1 | | 12/2012 |

OTHER PUBLICATIONS

Japanese Office Action, dated Jun. 26, 2018, for counterpart Japanese Application No. 2017-514133, with an English translation.
Chinese Office Action and Search Report for counterpart Application No. 201680011890.3, dated Apr. 28, 2018, with English translation of the Search Report.
International Search Report for PCT/JP2016/062376 dated Aug. 2, 2016.
Written Opinion of the International Searching Authority for PCT/JP2016/062376 (PCT/ISA/237) dated Aug. 2, 2016.
Extended European Search Report, dated Oct. 11, 2018, issued in counterpart European Application No. 16783151.0.
Russian Office Action, dated Sep. 28, 2018, for counterpart Russian Application No. 2017134752, with an English translation.
Korean Notice of Allowance, dated May 15, 2019, for corresponding Korean Application No. 10-2017-7024140, with an English translation.

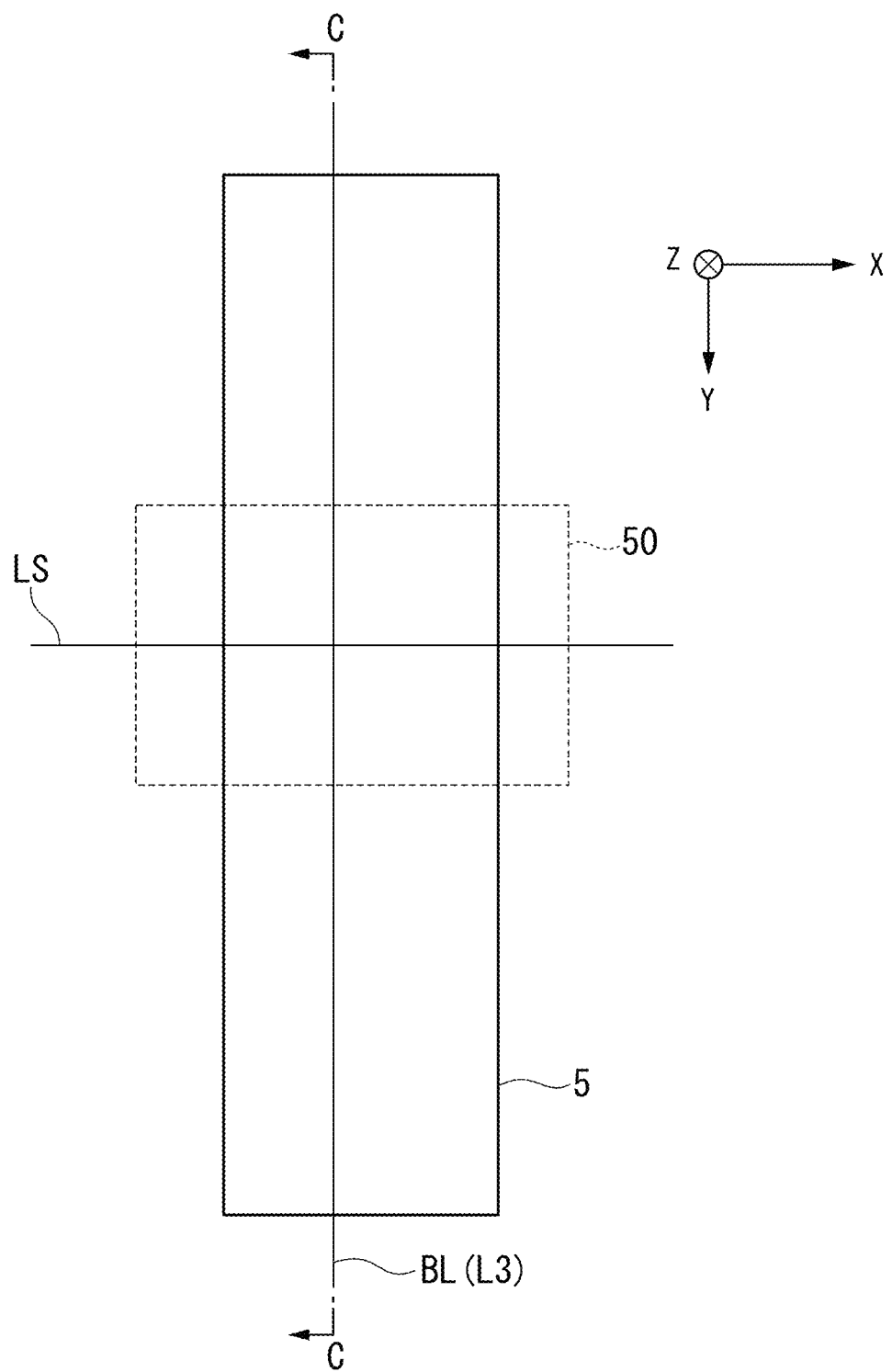

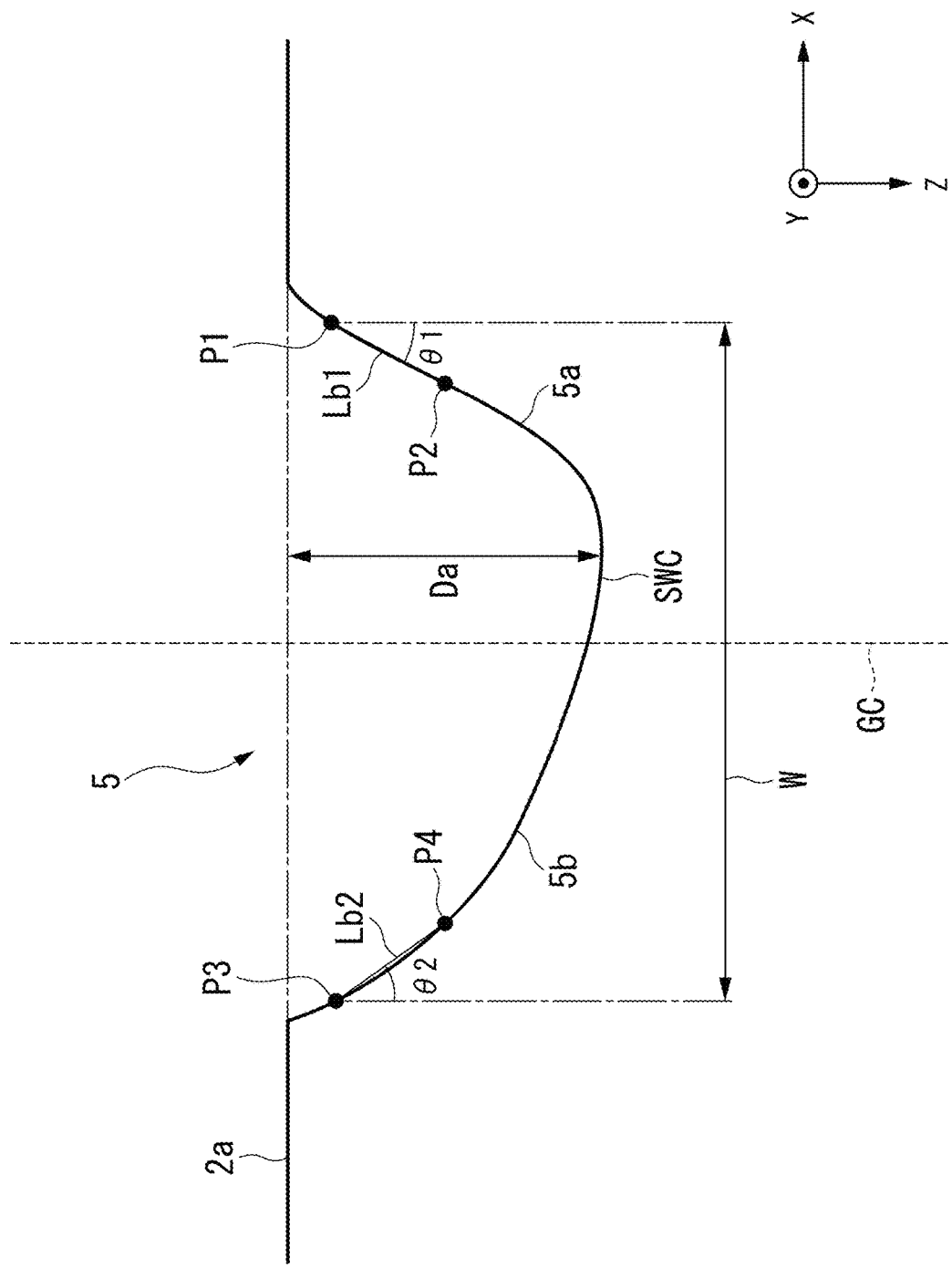

GRAIN-ORIENTED ELECTRICAL STEEL SHEET

TECHNICAL FIELD OF THE INVENTION

The present invention relates to a grain-oriented electrical steel sheet.

Priority is claimed on Japanese Patent Application No. 2015-086300, filed on Apr. 20, 2015, the content of which is incorporated herein by reference.

BACKGROUND ART

In the related art, as a steel sheet for an iron core of a transformer, there is known a grain-oriented electrical steel sheet that exhibits excellent magnetic characteristics in a specific direction. The grain-oriented electrical steel sheet is a steel sheet in which a crystal orientation is controlled so that a magnetization easy axis of a crystal grain and a rolling direction match each other by a combination of a cold rolling treatment and an annealing treatment. It is preferable that an iron loss of the grain-oriented electrical steel sheet is as small as possible.

The iron loss is classified into an eddy current loss and a hysteresis loss. In addition, the eddy current loss is classified into a classical eddy current loss and an anomalous eddy current loss. Typically, there is known a grain-oriented electrical steel sheet in which an insulating film is formed on a surface of a steel sheet (base metal) of which a crystal orientation is controlled as described above so as to reduce the classical eddy current loss. The insulating film also plays a role of applying electrical insulating properties, tensile strength, heat resistance, and the like to the steel sheet. Furthermore, recently, there is also known a grain-oriented electrical steel sheet in which a glass film is formed between the steel sheet and the insulating film.

On the other hand, as a method of reducing the anomalous eddy current loss, there is known a magnetic domain control method of narrowing a width of a 180° magnetic domain (performing refinement of the 180° magnetic domain) by forming a stress strain portion or a groove portion, which extends in a direction intersecting the rolling direction, at a predetermined interval along the rolling direction. In the method of forming the stress strain, a 180° magnetic domain refinement effect of a reflux magnetic domain, which occurs in the strain portion, is used. A representative method thereof is a method of using a shock wave or rapid heating with laser irradiation. In this method, a surface shape of an irradiated portion hardly varies. On the other hand, in the method of forming the groove, a demagnetizing field effect due to a magnetic pole, which occurs in a groove side wall, is used. In this case, it is known that when a cross-sectional shape of the groove is close to a rectangle, the magnetic domain control effect is high (Patent Document 4). That is, the magnetic domain control is classified into a strain applying type and a groove forming type.

In a case of manufacturing a wound core transformer by using the grain-oriented electrical steel sheet, it is necessary to perform a stress relief annealing treatment so as to remove a deformation strain which occurs when the grain-oriented electrical steel sheet is coiled in a coil shape. In a case of manufacturing a wound core by using the grain-oriented electrical steel sheet that is subjected to the magnetic domain control by the strain applying method, the strain is disappeared due to execution of the stress relief annealing treatment. Therefore, the magnetic domain refinement effect (that is, an anomalous eddy current loss reducing effect) is also lost.

On the other hand, in a case of manufacturing the wound core by using the grain-oriented electrical steel sheet that is subjected to the magnetic domain control by the groove forming method, the groove is not lost even when executing the stress relief annealing treatment. Accordingly, it is possible to maintain the magnetic domain refinement effect. Accordingly, in a method of manufacturing a magnetic domain control material for the wound core, the groove forming type is employed.

Furthermore, in a case of manufacturing a stacked core transformer, the stress relief annealing is not performed. Accordingly, it is possible to selectively employ any one of the strain applying type and the groove forming type.

Furthermore, in a laser method that is a representative method of the strain applying type, for example, as disclosed in Patent Document 5, when being irradiated with a laser having relatively high intensity, a steel sheet surface is slightly melted, and a moderate depression having a depth of approximately 10 μm may be formed. However, in the moderate depression as described above, there is no occurrence of a magnetic pole with which the magnetic domain control effect is obtained. As a result, it is known that the magnetic domain control effect is lost after the stress relief annealing.

As the groove forming type magnetic domain control method, typically, there are known an electrolytic etching method in which a groove is formed in a steel sheet surface of the grain-oriented electrical steel sheet through the electrolytic etching method (refer to Patent Document 1), a gear press method in which a groove is formed in a steel sheet surface by mechanically pressing a gear on the steel sheet surface of the grain-oriented electrical steel sheet (refer to the following Patent Document 2), and a laser irradiation method in which a groove is formed in a steel sheet surface of the grain-oriented electrical steel sheet through laser irradiation (refer to the following Patent Document 3).

In the electrolytic etching method, for example, an insulating film (or a glass film) on the steel sheet surface is removed in a linear shape with a laser or mechanical means, and then electrolytic etching is performed with respect to a portion at which the steel sheet is exposed, thereby forming a groove in the steel sheet surface. In a case of employing the electrolytic etching method, a process of manufacturing the grain-oriented electrical steel sheet becomes complicated. Therefore, there is a problem that the manufacturing cost increases. In addition, in the gear press method, since the steel sheet that is the grain-oriented electrical steel sheet is a very hard steel sheet containing 3 mass % of Si, abrasion and damage of the gear are likely to occur. In a case of employing the gear press method, when the gear is abraded, the groove becomes shallow, and a difference occurs in a groove depth. Therefore, there is a problem that it is difficult to sufficiently attain the anomalous eddy current loss reducing effect.

On the other hand, in a case of the laser irradiation method, direct working is performed. Accordingly, a complicated process such as etching is not necessary. In addition, non-contact type working is performed, and thus the same abrasion of the gear as in press working and the like do not occur. As a result, it is possible to stably form a groove on the steel sheet surface. For example, the following Patent Document 4 discloses a technology of improving the magnetic domain refinement effect (iron loss reducing effect) by making a groove contour shape (groove cross-sectional shape) on a cross section, which is perpendicular to a groove extension direction, close to a rectangle in the grain-oriented electrical steel sheet in which the groove is formed in the steel sheet surface according to a laser irradiation method.

PRIOR ART DOCUMENT

Patent Document

[Patent Document 1] Japanese Examined Patent Application, Second Publication No. S62-54873
[Patent Document 2] Japanese Examined Patent Application, Second Publication No. S62-53579
[Patent Document 3] Japanese Unexamined Patent Application, First Publication No. H6-57335
[Patent Document 4] Japanese Unexamined Patent Application, First Publication No. 2012-177164
[Patent Document 5] Japanese Unexamined Patent Application, First Publication No. 2007-2334

DISCLOSURE OF THE INVENTION

Problems to be Solved by the Invention

As an index that indicates the performance of the grain-oriented electrical steel sheet, there is a magnetic flux density (for example, a magnetic flux density B8 that occurs in a magnetic field of 800 A/m) in addition to the above-described iron loss. In the grain-oriented electrical steel sheet, it is preferable that the iron loss is low and the magnetic flux density is high. However, when a groove is formed in the steel sheet surface, the magnetic flux density decreases. Particularly, as disclosed in Patent Document 4, as the groove cross-sectional shape is closer to a rectangle, the volume of iron, which is removed from the steel sheet, increases. Therefore, there is a problem that a decrease in the magnetic flux density becomes significant. In addition, when the electrical steel sheet, in which a groove is formed by using a high heat source such as a laser, is subjected to bending working when being used in a wound iron core, there is a problem that the steel sheet is likely to be fractured from the groove as a starting point.

The invention has been made in consideration of the above-described problems, and an object thereof is to make maximization of an iron loss reducing effect and minimization of a decrease in a magnetic flux density be compatible with each other with good balance in a grain-oriented electrical steel sheet in which a groove is formed in a steel sheet surface for magnetic domain refinement.

Means for Solving the Problem

The gist of the invention is as follows.
(1) According to an aspect of the invention, there is provided a grain-oriented electrical steel sheet including a steel sheet having a steel sheet surface in which a groove, which extends in a direction intersecting a rolling direction and of which a groove depth direction matches a sheet thickness direction, is formed. An average depth D of the groove is greater than 10 μm and equal to or less than 40 μm. In a case where the groove is seen on a groove-width-direction cross-section that is perpendicular to a groove extension direction, when a center of the groove in the groove width direction is defined as a groove width center, a deepest portion of the groove deviates from the groove width center toward one side in the groove width direction, and a cross-sectional shape of the groove is asymmetric with respect to the groove width center as a reference in the groove width direction. In a case where the groove is seen on the groove-width-direction cross-section, the groove includes a first groove surface and a second groove surface as a pair of inclined surfaces which are inclined toward the deepest portion of the groove from the steel sheet surface, and the groove width center is located on a second groove surface side when seen from the deepest portion. When an angle, which is made by a first groove end straight line obtained through linear approximation of the first groove surface and the sheet thickness direction, is defined as a first angle θ1, and an angle, which is made by a second groove end straight line obtained through linear approximation of the second groove surface and the sheet thickness direction, is defined as a second angle θ2, the first angle θ1 and the second angle θ2 satisfy following Conditional Expressions (1) to (3).

$$0° \leq \theta1 \leq 50° \tag{1}$$

$$\theta1 < \theta2 \leq 75° \tag{2}$$

$$\theta2 - \theta1 \geq 10° \tag{3}$$

(2) In the grain-oriented electrical steel sheet according to (1), in the steel sheet, a grain size of a crystal grain that is in contact with the groove may be 5 μm or greater.
(3) In the grain-oriented electrical steel sheet according to (2), when the groove is seen on the groove-width-direction cross-section, a grain size of a crystal grain, which exists on a lower side of the groove in the steel sheet in the sheet thickness direction, may be equal to or greater than 5 μm and equal to or less than the sheet thickness of the steel sheet.
(4) In the grain-oriented electrical steel sheet according to any one of (1) to (3), when the groove is seen on a longitudinal groove cross-section including the groove extension direction and the sheet thickness direction, an arithmetic average height Ra of a roughness curve, which constitutes a contour of a groove bottom region of the groove, may be 1 μm to 3 μm, and an average length RSm of a roughness curve element, which constitutes the contour of the groove bottom region, may be 10 μm to 150 μm.

Effects of the Invention

According to the aspect of the invention, it is possible to make maximization of the iron loss reducing effect and minimization of a decrease in the magnetic flux density be compatible with each other with good balance in a grain-oriented electrical steel sheet in which a groove is formed in a steel sheet surface for magnetic domain refinement.

BRIEF DESCRIPTION OF THE DRAWINGS

FIG. 6 is a fourth explanatory view relating to the method of specifying the average depth D of the groove 5.

FIG. 8 is a third explanatory view relating to the method of specifying the contour of the groove 5 in the groove-width-direction cross-section.

EMBODIMENTS OF THE INVENTION

Hereinafter, a preferred embodiment of the invention will be described in detail. However, the invention is not limited to configurations disclosed in this embodiment, and various modifications can be made in a range not departing from the gist of the invention. In addition, the lower limit and the upper limit are also included in numerical value limiting ranges to be described later.

However, the lower limit is not included in a numerical value limiting range that is described as "greater than" the lower limit, and the upper limit is not included in a numerical value limiting range that is described as "less than" the upper limit.

Hereinafter, an embodiment of the invention will be described in detail with reference to the accompanying drawings.

Figure 1:
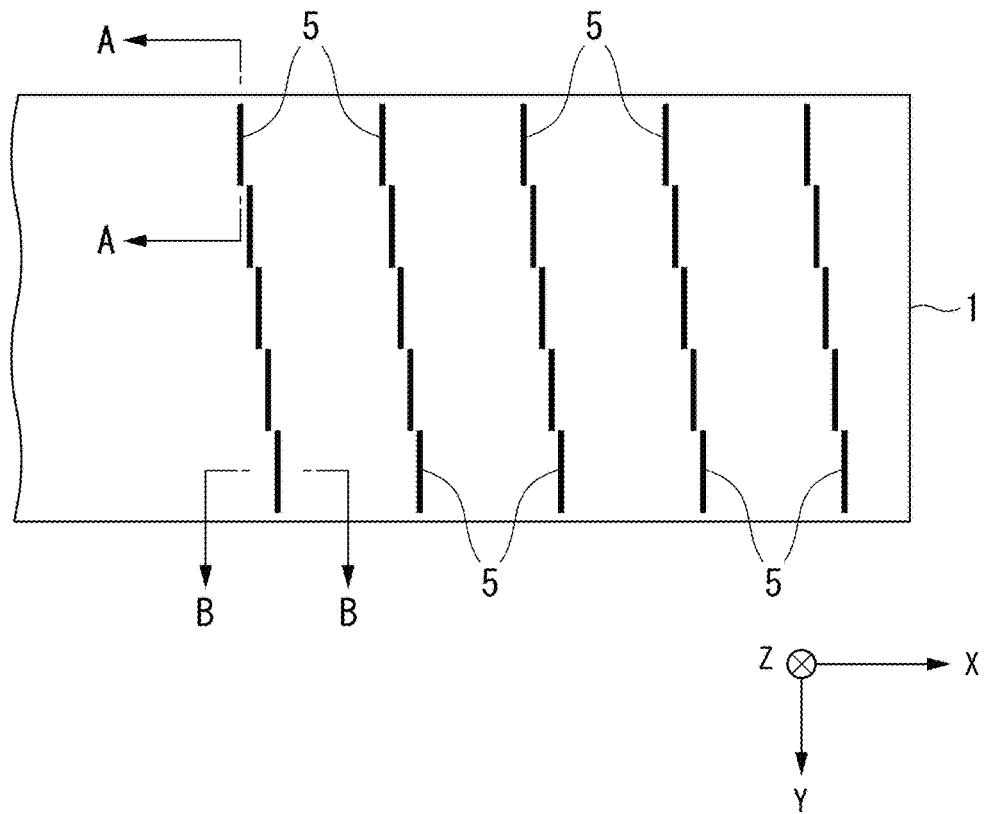
FIG. 1 is a plan view of a grain-oriented electrical steel sheet 1 according to an embodiment of the invention.
Figure 2:
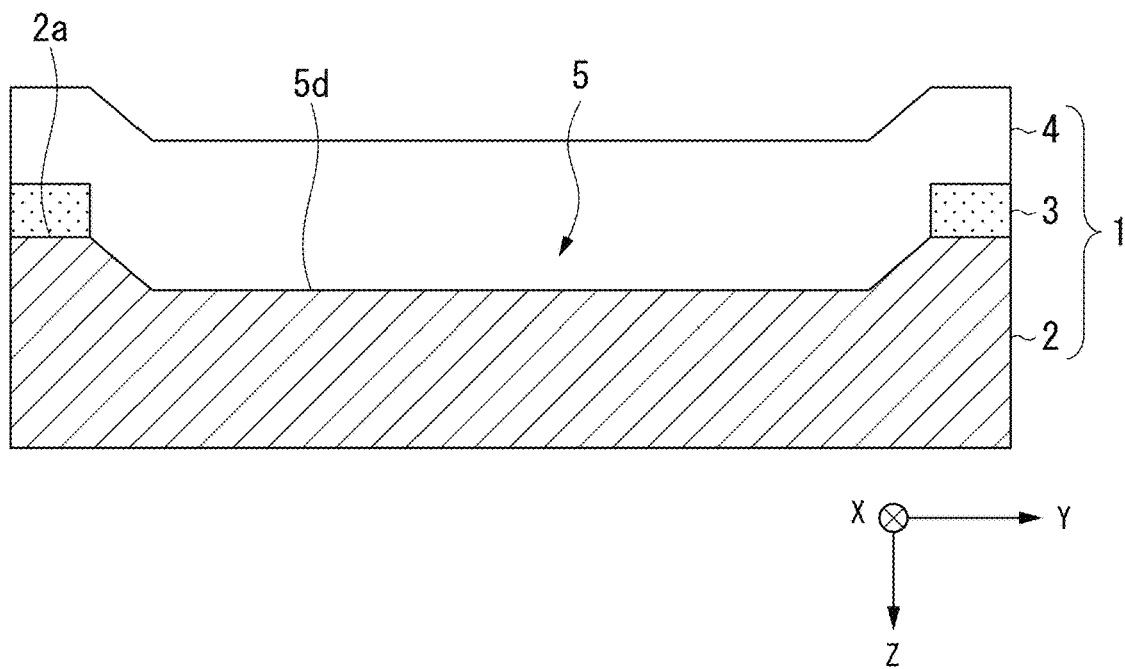
FIG. 2 is an arrow cross-sectional view taken along line A-A in FIG. 1 (view when a groove 5 is seen on a cross-section including a groove extension direction).
Figure 3:
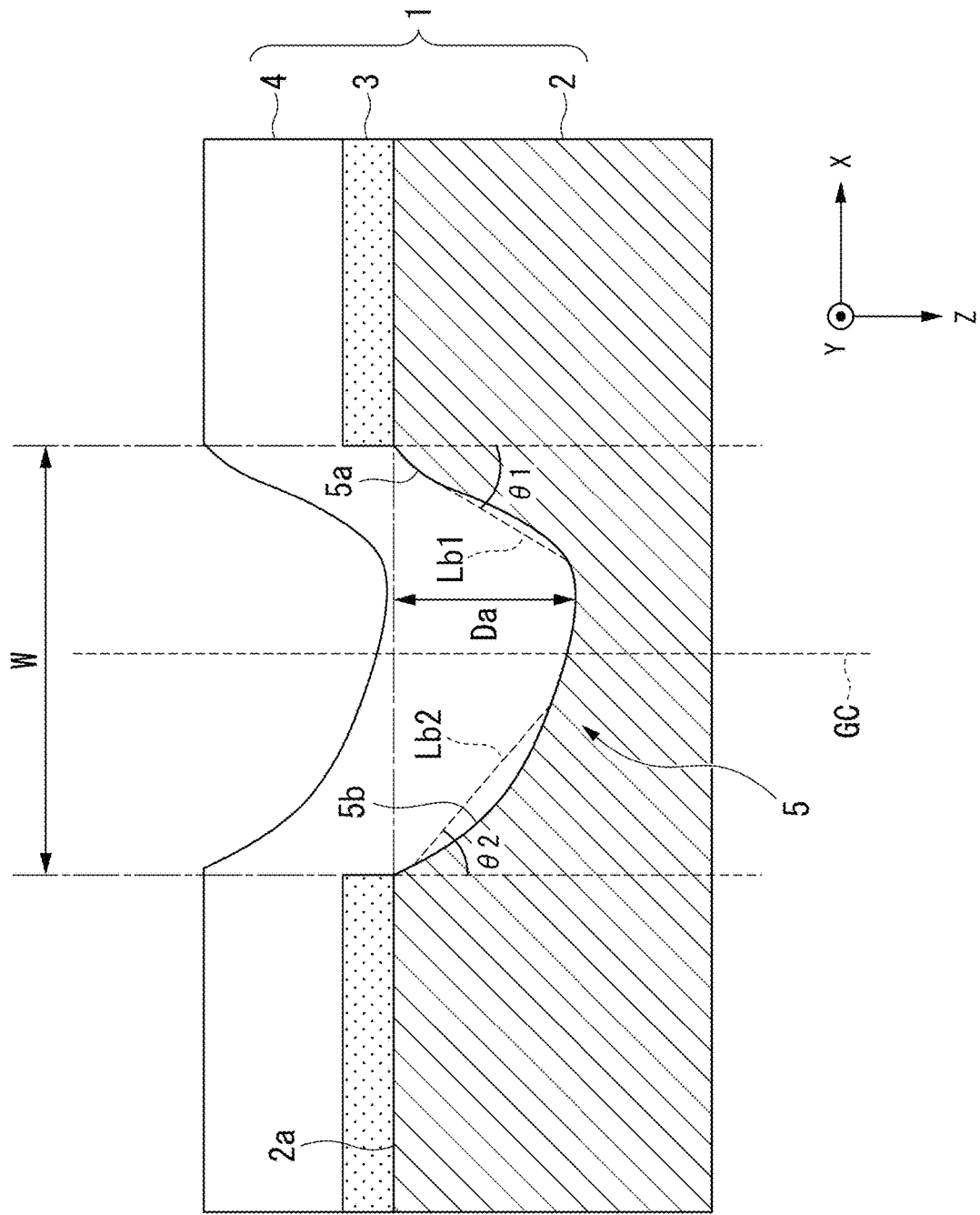
FIG. 3 is an arrow cross-sectional view taken along line B-B in FIG. 1 (view when the groove 5 is seen on a cross-section perpendicular to the groove extension direction).

FIG. 1 is a plan view of a grain-oriented electrical steel sheet 1 according to this embodiment. FIG. 2 is an arrow cross-sectional view taken along line A-A in FIG. 1. FIG. 3 is an arrow cross-sectional view taken along line B-B in FIG. 1. Furthermore, In FIG. 1 to FIG. 3, a rolling direction of the grain-oriented electrical steel sheet 1 is defined as X, a sheet width direction (direction perpendicular to the rolling direction in the same plane) of the grain-oriented electrical steel sheet 1 is defined as Y, and a sheet thickness direction (direction perpendicular to an XY plane) of the grain-oriented electrical steel sheet 1 is defined as Z.

As illustrated in FIGS. 1 to 3, the grain-oriented electrical steel sheet 1 includes a steel sheet (base metal) 2 in which a crystal orientation is controlled by a combination of a cold-rolling treatment and an annealing treatment so that a magnetization easy axis of a crystal grain and the rolling direction X match each other, a glass film 3 that is formed on a surface (steel sheet surface 2a) of the steel sheet 2, and an insulating film 4 that is formed on a surface of the glass film 3.

As illustrated in FIG. 1, a plurality of grooves 5, which extends in a direction that intersects the rolling direction X and in which a groove depth direction matches the sheet thickness direction Z, are formed on the steel sheet surface 2a along the rolling direction X at a predetermined interval for magnetic domain refinement. That is, FIG. 2 is a view when one of the grooves 5 is seen on a cross-section including the groove extension direction and the sheet thickness direction Z. FIG. 3 is a view when the one groove 5 is seen on a cross-section that perpendicular to the groove extension direction. Furthermore, the grooves 5 may be provided to intersect the rolling direction X, and it is not necessary for the groove extension direction and the rolling direction X to intersect each other. However, in this embodiment, a case where the groove extension direction and the rolling direction X intersect each other will be exemplified for convenience of explanation. In addition, in a case where each of the grooves 5 is seen from the sheet thickness direction Z (in a case of a plan view of the groove 5), the groove 5 may have an arch shape. However, in this embodiment, the groove 5 having a linear shape is exemplified for convenience of explanation.

The steel sheet 2 contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

The chemical components of the steel sheet 2 are chemical components which are preferable for a control to a Goss texture in which a crystal orientation is integrated to a {110}<001> orientation. Among the elements, Si and C are basic elements, and acid-soluble Al, N, Mn, Cr, Cu, P, Sn, Sb, Ni, S, and Se are selective elements. The selective elements may be contained in correspondence with the purpose thereof. Accordingly, it is not necessary to limit the lower limit, and the lower limit may be 0%. In addition, the effect of this embodiment does not deteriorate even when the selective elements are contained as impurities. In the steel sheet 2, the remainder of the basic elements and the selective elements may be composed of Fe and impurities. In addition, the impurities represent elements which are inavoidably mixed in due to ore and scrap as a raw material, or a manufacturing environment and the like when industrially manufacturing the steel sheet 2.

In addition, an electrical steel sheet is typically subjected to purification annealing during secondary recrystallization. Discharge of an inhibitor forming element to the outside of a system occurs in the purification annealing. Particularly, a decrease in a concentration significantly occurs with respect to N and S, and the concentration becomes 50 ppm or less. Under typical purification annealing conditions, the concentration becomes 9 ppm or less, or 6 ppm or less. If the purification annealing is sufficiently performed, the concentration reaches to a certain extent (1 ppm or less) at which detection is impossible in typical analysis.

The chemical component of the steel sheet 2 may be measured in accordance with a typical steel analysis method. For example, the chemical components of the steel sheet 2 may be measured by using inductively coupled plasma-atomic emission spectrometry (ICP-AES). Specifically, it is possible to specify the chemical components by performing measurement for a test piece of 35 mm square, which is obtained from the central position of the steel sheet 2 after film removal, by using ICPS-8100 (a measurement device, manufactured by Shimadzu Corporation) and the like under conditions based on a calibration curve that is created in advance. Furthermore, C and S may be measured by using a combustion-infrared ray absorption method, and N may be measured by using inert gas fusion-thermal conductivity method.

For example, the glass film 3 is constituted by a composite oxide such as forsterite ($Mg_2SiO_4$), spinel ($MgAl_2O_4$), and cordierite ($Mg_2Al_4Si_5O_{16}$). Although details will be described later, the glass film 3 is a film that is formed to prevent adhering to the steel sheet 2 in a final annealing process that is one of manufacturing processes of the grain-oriented electrical steel sheet 1. Accordingly, the glass film 3 is not an essential element among constituent elements of the grain-oriented electrical steel sheet 1.

For example, the insulating film 4 contains colloidal silica and phosphate, and plays a roll of applying electrical insulating properties, a tensile force, corrosion resistance, heat resistance, and the like to the steel sheet 2.

Furthermore, for example, the glass film 3 and the insulating film 4 can be removed by the following method. The grain-oriented electrical steel sheet 1 including glass film 3 or the insulating film 4 is immersed in an aqueous sodium hydroxide solution containing 10 mass % of NaOH and 90 mass % of $H_2O$ at 80° C. for 15 minutes. Then, the grain-oriented electrical steel sheet 1 is immersed in an aqueous sulfuric acid solution containing 10 mass % of $H_2SO_4$ and 90 mass % of $H_2O$ at 80° C. for 3 minutes. Then, the grain-oriented electrical steel sheet 1 is immersed in an aqueous nitric acid solution containing 10 mass % of $HNO_3$ and 90 mass % of $H_2O$ at room temperature for a time period that is slightly shorter than 1 minute, and is washed. Finally, the grain-oriented electrical steel sheet 1 is dried by using a warm wind blower for a time period that is slightly shorter than 1 minute. Furthermore, in a case where the glass film 3 or the insulating film 4 is removed from the grain-oriented electrical steel sheet 1 according the above-described method, it is confirmed that a shape or roughness of the groove 5 of the steel sheet 2 is approximately the same as a shape or roughness before forming the glass film 3 or the insulating film 4.

As illustrated in FIG. 3, in this embodiment, in a case where the groove 5 is seen on a cross-section (a groove-width-direction cross-section or a transverse groove cross-section) that is perpendicular to a groove extension direction (direction that is parallel to the sheet width direction Y in this embodiment), a depth from the steel sheet surface 2a to the deepest portion of the groove 5 is set as a groove depth Da, and the center of the groove 5 in a groove width direction (direction that is parallel to the rolling direction X in this embodiment) is set as a groove width center GC. As illustrated in FIG. 3, in the grain-oriented electrical steel sheet 1 of this embodiment, the deepest portion of the groove 5 deviates from the groove width center GC toward one side in the groove width direction, and a cross-sectional shape of the groove 5 is asymmetrical with respect to the groove width center GC as a reference in the groove width direction.

In addition, in a case where the groove 5 is seen on the transverse groove cross-section, the groove 5 includes a first groove surface 5a and a second groove surface 5b as a pair of inclined surfaces which are inclined from the steel sheet surface 2a toward the deepest portion of the groove 5. When being seen from the deepest portion of the groove 5, the groove width center GC is located on a second groove surface 5b side. In addition, in a case where the groove 5 is seen on the transverse groove cross-section, an angle, which is made by a first groove end straight line Lb1 obtained through linear approximation of the first groove surface 5a and the sheet thickness direction Z, is set as a first angle θ1, and an angle, which is made by a second groove end straight line Lb2 obtained through linear approximation of the second groove surface 5b and the sheet thickness direction Z, is set as a second angle θ2.

In this embodiment, the average depth D of the groove 5 is greater than 10 μm and equal to or less than 40 μm. In a case where the groove 5 is seen on the transverse groove cross-section, the deepest portion of the groove 5 deviates from the groove width center GC toward one side in the groove width direction, and the cross-sectional shape of the groove 5 is asymmetrical with respect to the groove width center GC as a reference in the groove width direction. In the following description, the characteristic relating to the average depth D of the groove 5 is referred to as a depth condition, and the characteristic relating to the cross-sectional shape of the groove 5 is referred to as a shape condition.

In a state in which the groove width of the groove 5, which satisfies the depth condition and the shape condition, is fixed to a constant value, the first angle θ1 always becomes an acute angle regardless of a value of the average depth D, and the second angle θ2 is always greater than the first angle θ1. In addition, in a state in which the groove width of the groove 5 is fixed to a constant value, the first angle θ1 decreases along with an increase in the average depth D, and the first angle θ1 increases along with a decrease in the average depth D.

When the average depth D increases, a volume of iron that is removed from the steel sheet 2 increases. Accordingly, a decrease amount of a magnetic flux density also increases. However, when the first angle θ1 decreases along with an increase in the average depth D, an anti-magnetic field effect of a magnetic pole, which is shown on a lateral surface of the groove 5, increases. Accordingly, a magnetic domain refinement effect (iron loss reducing effect) also increases. On the other hand, when the average depth D decreases, a volume of iron that is removed from the steel sheet 2 decreases. Accordingly, the decrease amount of the magnetic flux density also decreases. However, when the first angle θ1 increases along with a decrease in the average depth D, the anti-magnetic field effect of the magnetic pole that is shown on the lateral surface of the groove 5 decreases. Accordingly, the iron loss reducing effect also decreases.

As described above, when the average depth D of the groove 5 is made to be large by giving priority to maximization of the iron loss reduction effect, a decrease in the magnetic flux density becomes significant. On the other hand, when the average depth D of the groove 5 is made to be small by giving priority to minimization of a decrease in the magnetic flux density, it is difficult to obtain a sufficient iron loss reducing effect. From a result of verification made by the present inventors, it is proved that it is important for the groove 5 to satisfy the shape condition and the depth condition in which the average depth D of the groove 5 is greater than 10 μm and equal to or less than 40 μm so as to make the maximization of the iron loss reducing effect and the minimization of a decrease in the magnetic flux density be compatible with each other with good balance.

In a case where the average depth D is 10 μm or less (in a case where the average depth D is shallower than 10 μm), a volume of iron that is removed from the steel sheet 2 decreases, and thus a decrease amount of the magnetic flux density also decreases. However, since the first angle θ1 increases, the anti-magnetic field effect of a magnetic pole that is shown on a lateral surface of the groove 5 decreases. As a result, in a case where the average depth D is 10 μm or less, it is difficult to obtain a sufficient iron loss reducing effect. On the other hand, in a case where the average depth D is greater than 40 μm (in a case where the average depth D is deeper than 40 μm), the first angle θ1 decreases. Accordingly, the anti-magnetic field effect of the magnetic pole that is shown on the lateral surface of the groove 5 increases. As a result, it is possible to obtain a great iron loss reducing effect. However, in a case where the average depth D is greater than 40 μm, a volume of iron that is removed from the steel sheet 2 increases. Accordingly, a decrease amount of a magnetic flux density also increases.

As described above, in a case where the average depth D is 10 μm or less, and in a case where the average depth D is greater than 40 μm, it is difficult to make the maximization of the iron loss reducing effect and the minimization of the decrease in the magnetic flux density be compatible with each other. Accordingly, in this embodiment, the groove 5, which satisfies both of the shape condition and the depth condition in which the average depth D is greater than 10 μm and equal to or less than 40 μm, is provided in the steel sheet 2. According to this, the maximization of the iron loss reducing effect and the minimization of the decrease in the magnetic flux density are made to be compatible with each other with good balance.

Furthermore, in the groove 5, when a region, which satisfies the depth condition and the shape condition, is defined as a groove asymmetrical region, and an existence rate of the groove asymmetrical region in the groove extension direction is defined as α (=a total length of the groove asymmetrical region in the groove extension direction/a total length of the groove 5), the greater the existence rate α of the groove asymmetrical region in the groove 5 is, the greater the effect of suppressing the decrease in the magnetic flux density is. Accordingly, it is preferable that the existence rate α of the groove asymmetrical region is as great as possible. However, when the groove asymmetrical region exists at least in a partial section of the groove 5, it is possible to obtain the above-described effect. Accordingly, the existence rate α of the groove asymmetrical region may be greater than zero.

When the groove cross-sectional shape is set to be asymmetrical, it is possible to make the maximization of the iron loss reducing effect and the minimization of the decrease in the magnetic flux density be compatible with each other with good balance. That is, in a groove having an asymmetrical cross-sectional shape, a volume of iron that is removed from a steel sheet is further suppressed in comparison to a groove having a rectangular cross-sectional shape. As a result, it is possible to suppress a decrease in the magnetic flux density. In addition, in the groove having the asymmetrical cross-sectional shape, when a shape, which is close to that of a lateral surface of a groove having a rectangular cross-sectional shape with a great iron loss reducing effect, partially remains, it is possible to suppress a decrease in the iron loss effect.

With regard to the asymmetrical shape of the groove 5, it is preferable that the first angle θ1 and the second angle θ2 satisfy the following Conditional Expressions (1) to (3). From a result of verification made by the present inventors, when the groove 5 satisfies the depth condition and the shape condition, and the first angle θ1 and the second angle θ2 satisfy the following Conditional Expressions (1) to (3), the balance between the maximization of the iron loss reducing effect and the minimization of the decrease in the magnetic flux density becomes more optimized.

$$0° \leq \theta 1 \leq 50° \quad (1)$$

$$\theta 1 < \theta 2 \leq 75° \quad (2)$$

$$\theta 2 - \theta 1 \geq 10° \quad (3)$$

From the viewpoint of optimizing the balance between the maximization of the iron loss reducing effect and the minimization of the decrease in the magnetic flux density, it is more preferable that the lower limit of the first angle θ1 is 20°, and a difference value (θ2−θ1) between the second angle θ2 and the first angle θ1 is 15° or greater.

However, in a case of observing the transverse groove cross-section of the groove 5 with an electron microscope and the like, a boundary between the groove 5 and the steel sheet surface 2a, the contour of the groove 5, and the like may be unclear. Accordingly, it is important how to specify the average depth D of the groove 5, the deepest portion (groove depth Da) of the groove 5, the groove width center GC, the first groove surface 5a, and the second groove surface 5b. An example of the specifying method will be described below.

Figure 4:
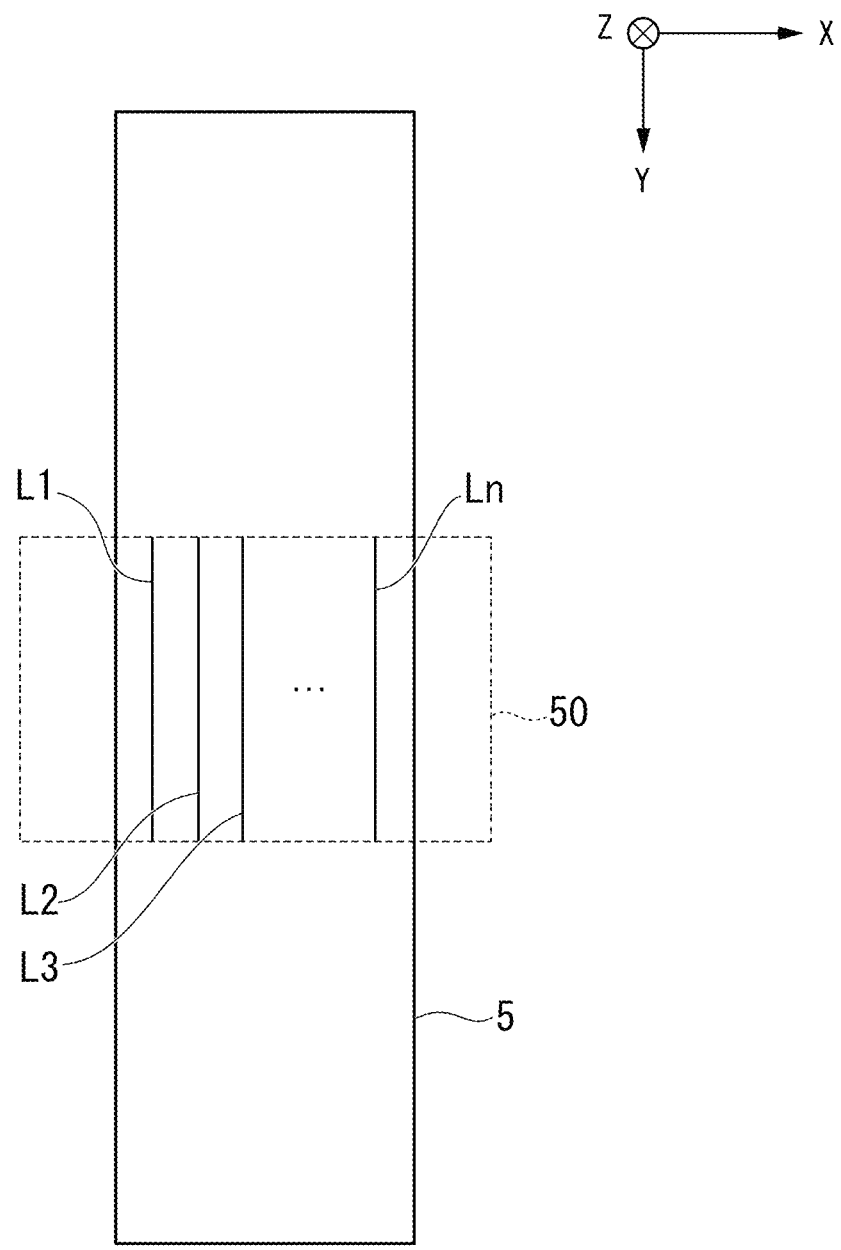
FIG. 4 is a first explanatory view relating to a method of specifying an average depth D of the groove 5.
Figure 5A:
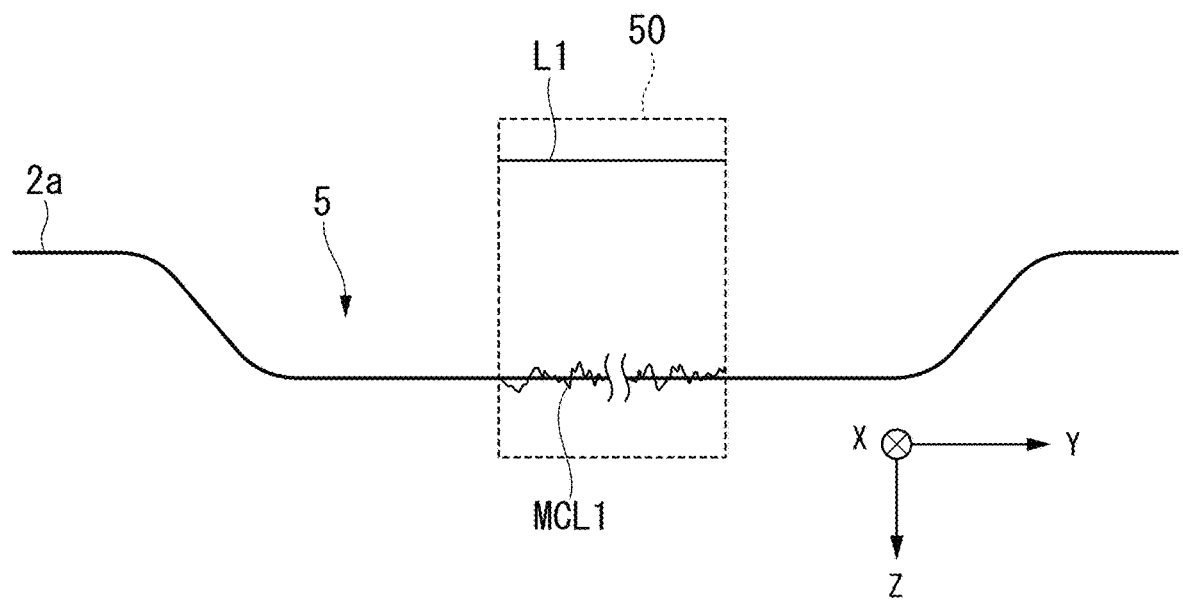
FIG. 5A is a second explanatory view relating to the method of specifying the average depth D of the groove 5.

As illustrated in FIG. 4, in a case where the groove 5 is seen from the sheet thickness direction Z (in plan view of the groove 5), an observation range 50 is set to a part of the groove 5, and a plurality of (n) virtual lines L1 to Ln are virtually set in the observation range 50 along the groove extension direction. It is preferable that the observation range 50 is set to a region excluding an end in the extension direction of the groove 5 (that is, a region in which a shape of the groove bottom is stable). For example, the observation range 50 may be an observation region in which a length in the groove extension direction is approximately 30 μm to 300 μm. Next, when measuring surface roughness of the groove 5 along the virtual line L1 by using a laser type surface roughness measuring device and the like, as illustrated in FIG. 5A, a measurement cross-section curve MCL1, which constitutes a contour of the groove 5 in the groove extension direction, is obtained in a shape conforming to the virtual line L1.

Figure 5B:
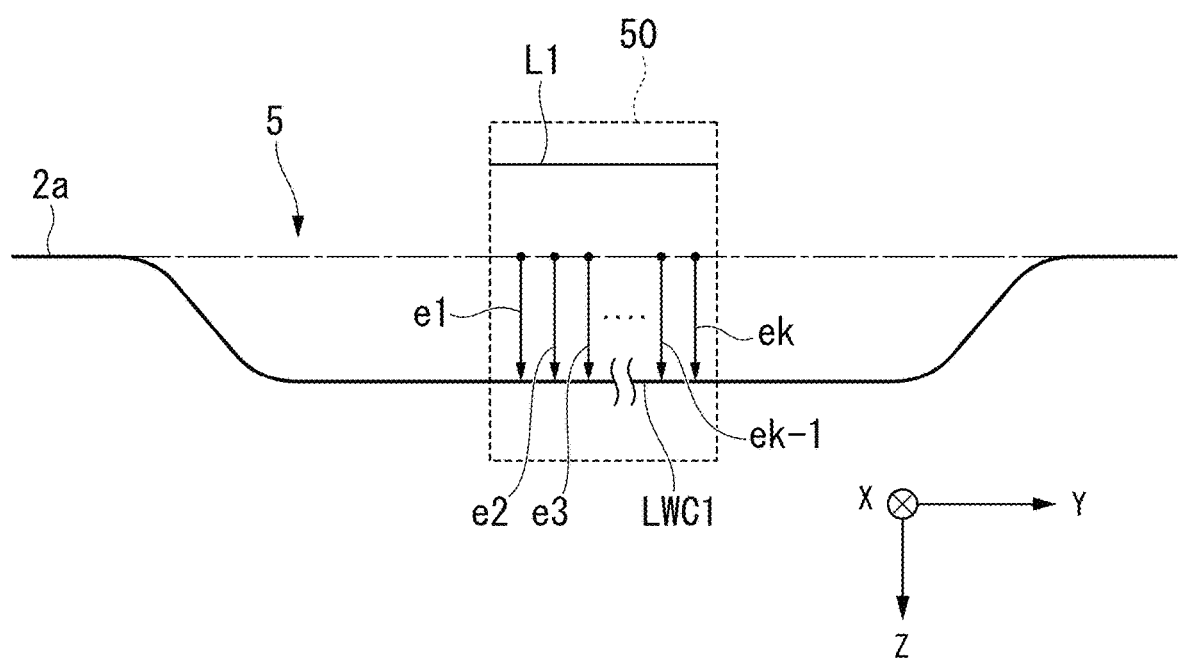
FIG. 5B is a third explanatory view relating to the method of specifying the average depth D of the groove 5.

After obtaining a cross-section curve by applying a low-pass filter (cut-off value: λs) to the measurement cross-section curve MCL1 obtained with respect to the virtual line L1 as described above, when a band filter (cut-off value: λf, λc) is applied to the cross-section curve to remove long wavelength components and short wavelength components from the cross-section curve, as illustrated in FIG. 5B, a waving curve LWC1, which constitutes a contour of the groove 5 in the groove extension direction, is obtained in a shape conforming to the virtual line L1. The waving curve is one kind of contour curves in combination with the following roughness curve. The roughness curve is a contour curve that is suitable to express, particularly, surface roughness of the contour with accuracy, and the waving curve is a contour curve that is suitable to simplify the shape of the contour with a smooth line.

As illustrated in FIG. 5B, when using the waving curve LWC1, distances (depths e1 to ek: unit is μm) in the sheet thickness direction Z between the steel sheet surface 2a and the contour (that is, the waving curve LWC1) of the groove 5 are obtained at a plurality of (k) positions along the virtual line L1. In addition, an average value (average groove depth D1) of the depths e1 to ek is obtained.

Average depths D2 to Dn are also obtained with respect to other virtual lines L2 to Ln according to the same measurement method.

Furthermore, it is necessary to measure a position (height) of the steel sheet surface 2a in the Z direction in advance so as to measure the distance between the steel sheet surface 2a and the contour (waving curve LWC1) of the groove 5. For example, the position (height) in the Z direction may be measured with respect to a plurality of sites on the steel sheet surface 2a in the observation range 50 by using the laser type surface roughness measuring device, and an average value of the measurement results may be used as the height of the steel sheet surface 2a.

In this embodiment, among the virtual lines L1 to Ln, a virtual line, which conforms to the groove extension direction and satisfies a condition in which an average depth becomes the maximum, is selected as a groove reference line BL, and an average depth that is obtained with respect to the groove reference line BL is defined as an average depth D (unit: μm) of the groove 5. For example, among average depths D1 to Dn which are obtained with respect to the respective virtual lines L1 to Ln, in a case where the average depth D3 is the maximum, as illustrated in FIG. 6, the virtual line L3 is defined as the groove reference line BL, and the average depth D3 that is obtained with respect to the virtual line L3 is defined as the average depth D of the groove 5.

Figure 7A:
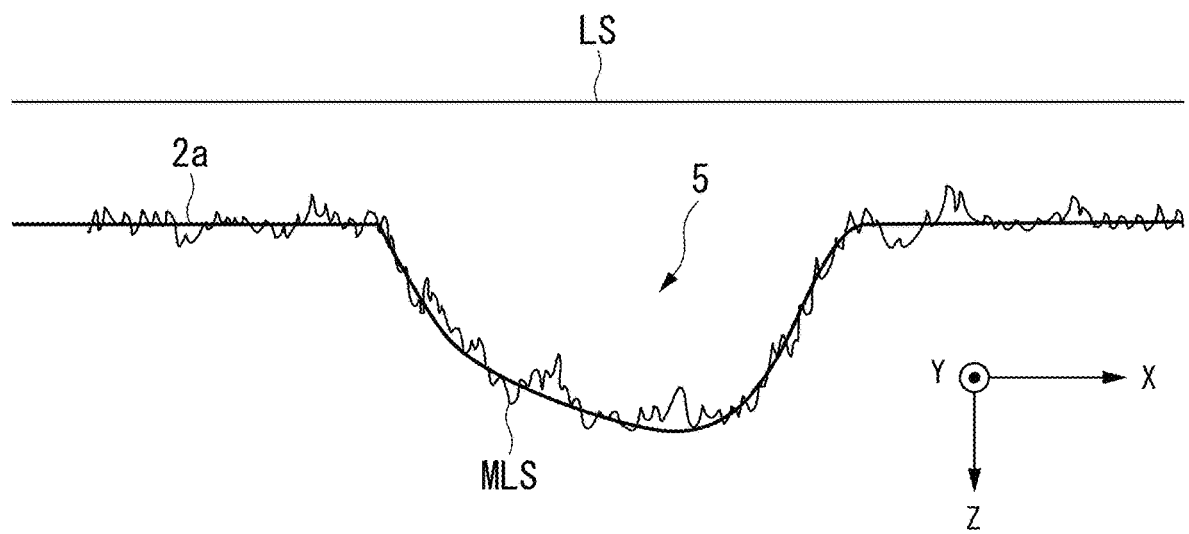
FIG. 7A is a first explanatory view relating to a method of specifying a contour of the groove 5 in a groove-width-direction cross-section.

In addition, as illustrated in FIG. 6, in a case where the groove 5 is seen from the sheet thickness direction Z (in a case of a plan view of the groove 5), a virtual line LS, which is parallel to a direction (groove width direction: a direction parallel to the rolling direction X in this embodiment) perpendicular to the groove extension direction, is virtually set in the observation range 50. The virtual line LS may be set at an arbitrary height in the sheet thickness direction Z. When measuring surface roughness of the steel sheet 2 including the groove 5 along the virtual line LS by using a laser type surface roughness measuring device and the like, as illustrated in FIG. 7A, a measurement cross-section curve MLS, which constitutes a contour of the groove 5 in the groove width direction, is obtained in a shape conforming to the virtual line LS.

Figure 7B:
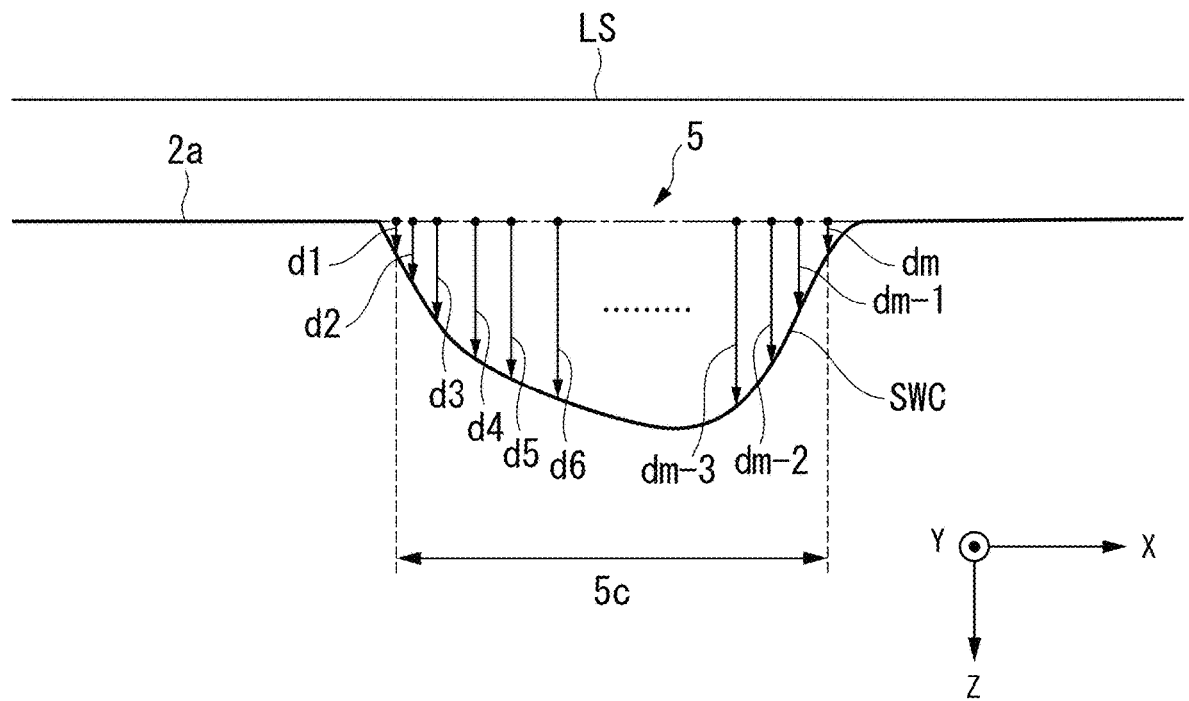
FIG. 7B is a second explanatory view relating to the method of specifying the contour of the groove 5 in the groove-width-direction cross-section.

After obtaining a cross-section curve by applying a low-pass filter (cut-off value: λs) to the measurement cross-section curve MLS obtained with respect to the virtual line LS as described above, when a band filter (cut-off value: λf, λc) is applied to the cross-section curve to remove long wavelength components and short wavelength components from the cross-section curve, as illustrated in FIG. 7B, a waving curve SWC (hereinafter, referred to as a transverse groove waving curve), which constitutes a contour of the groove 5 in the groove width direction, is obtained in a shape conforming to the virtual line LS. The waving curve is one kind of contour curves in combination with the following roughness curve. The roughness curve is a contour curve that is suitable to express, particularly, surface roughness of the contour with accuracy, and the waving curve is a contour curve that is suitable to simplify the shape of the contour with a smooth line.

As illustrated in FIG. 7B, when using the transverse groove waving curve SWC, distances (depths d1 to dm: unit is μm) in the sheet thickness direction Z between the steel sheet surface 2a and the contour (that is, the transverse groove waving curve SWC) of the groove 5 in the groove width direction are obtained at a plurality of (m) positions along the virtual line LS. In this embodiment, as illustrated in FIG. 7B, the waving curve SWC has one minimum value, and does not have a local maximum value. In this embodiment, among the depths d1 to dm obtained as described above, the greatest value is set as a groove depth Da (depth of the deepest portion of the groove 5). In addition, as illustrated in FIG. 7B, in the transverse groove waving curve SWC, a region satisfying the following Conditional Expression (4) is defined as a groove region 5c, and the center of the groove region 5c in the groove width direction is set as a groove center GC.

$$di \geq 0.05 \times Da \quad (4)$$

(Provided that, i is an integer of 1 to m)

In addition, as illustrated in FIG. 8, on the transverse groove waving curve SWC representing the contour of the groove 5, line segments, which are inclined from the steel sheet surface 2a toward the deepest portion of the groove 5, are set as a first groove surface 5a and a second groove surface 5b. As illustrated in FIG. 8, in the first groove surface 5a on the transverse groove waving curve SWC, a point, at which a depth from the steel sheet surface 2a in the sheet thickness direction Z becomes 0.05×Da, is set as P1, and a point, at which the depth from the steel sheet surface 2a in the sheet thickness direction Z becomes 0.50×Da, is set as P2. In the second groove surface 5b on the transverse groove waving curve SWC, a point, at which the depth from the steel sheet surface 2a in the sheet thickness direction Z becomes 0.05×Da, is set as P3, and a point, at which the depth from the steel sheet surface 2a in the sheet thickness direction Z becomes 0.50×Da, is set as P4.

In addition, as illustrated in FIG. 8, a straight line that connects the point P1 and the point P2 in the first groove surface 5a is set as a first groove end straight line Lb1, and a straight line that connects the point P3 and the point P4 in the second groove surface 5b is set as a second groove end straight line Lb2. In this manner, an angle, which is made by the first groove end straight line Lb1 obtained from the transverse groove waving curve SWC and the sheet thickness direction Z, is a first angle θ1, and an angle, which is made by the second groove end straight line Lb2 obtained from the transverse groove waving curve SWC and the sheet thickness direction Z, is a second angle θ2.

As described above, this embodiment exemplifies a case where the first groove surface 5a is subjected to linear approximation by the straight line connecting the two points on the first groove surface 5a, but another method may be used as a method for linear approximation of the first groove surface 5a. For example, the first groove surface 5a may be subjected to the linear approximation by using a least squares method. This is also true of linear approximation of the second groove surface 5b.

Furthermore, a groove width W of the groove 5 is defined as a distance between an intersection of the steel sheet surface 2a and the first groove surface 5a, and an intersection of the steel sheet surface 2a and the second groove surface 5b. Specifically, as illustrated in FIG. 8, when being seen on the transverse groove cross-section of the groove 5, a length of a line segment (groove opening) connecting the point P1 and the point P3 may be obtained. It is preferable that the groove width W is 10 μm to 250 μm so as to preferably obtain the magnetic domain refinement effect.

Meanwhile, in a process of manufacturing a wound core, bending working is performed with respect to the grain-oriented electrical steel sheet 1. In a electrical steel sheet in which a groove is machined with a laser, it was found that the steel sheet is highly likely to be fractured from a groove portion as a base point during a bending process. Accordingly, from a result obtained by the present inventors through detailed analysis of a crystal structure of the groove portion, they found that fracture is likely to occur in a case where a small grain size portion exists at the groove portion, that is, in a case where a melted and resolidified layer exists in the groove portion.

In the steel sheet 2, in a case where the melted and resolidified layer exists in the groove 5 of the steel sheet 5, when the grain-oriented electrical steel sheet 1 is bent, fracture is likely to occur from the melted and resolidified layer as a base point. That is, the present inventors have come to the following conclusion. When the melted and resolidified layer exists in the groove 5 of the steel sheet 2, bending-resistant characteristics of the grain-oriented electrical steel sheet 1 deteriorate.

Accordingly, in this embodiment, in the steel sheet 2, it is preferable that an average grain size of a crystal grain that is in contact with the groove 5 is 5 μm or greater. In a case where the melted and resolidified layer, which is derived from formation of the groove 5, exists at the periphery of the groove 5. There is a high possibility that preferable bending-resistant characteristics are not obtained. Accordingly, it is preferable that the melted and resolidified layer does not exist at the periphery of the groove 5. In a case where the melted and resolidified layer does not exist at the periphery of the groove 5, an average grain size of a crystal grain (secondary recrystallized grain) that is in contact with the groove 5 becomes 5 μm or greater. For example, the crystal shape of the melted and resolidified layer may become a long columnar shape that extends in a vertical direction from the surface. According to this, in the grain size of the crystal grain (secondary recrystallized grain) that is in contact with the groove 5, it is preferable that a short-axis length of a columnar grain not a long-axis length is 5 μm or greater. That is, in the crystal grain that is in contact with the groove 5, when being seen on an observation surface that is parallel to a sheet surface of the grain-oriented electrical steel sheet 1, it is preferable that the average grain size is 5 μm or greater. For example, the grain size of the crystal grain may be obtained with reference to a typical crystal grain size measurement method such as ASTM and E112, or may be obtained in accordance with an electron back scattering diffraction pattern (EBSD) method. For example, the groove 5, which does not include the melted and solidified region, may be obtained in accordance with the following manufacturing method.

Particularly, even in a case where the groove 5 is seen on the transverse groove cross-section, it is more preferable that a grain size of a crystal grain (secondary recrystallized grain), which exists on a lower side of the groove 5 in the steel sheet 2, in a sheet thickness direction is equal to or greater than 5 μm and equal to or less than a sheet thickness of the steel sheet 2. This characteristic represents that a fine grain layer (melted and resolidified layer), in which a grain size of a crystal grain in a sheet thickness direction is approximately 1 μm, does not exist on a lower side of the groove 5 in the steel sheet 2.

Figure 9:
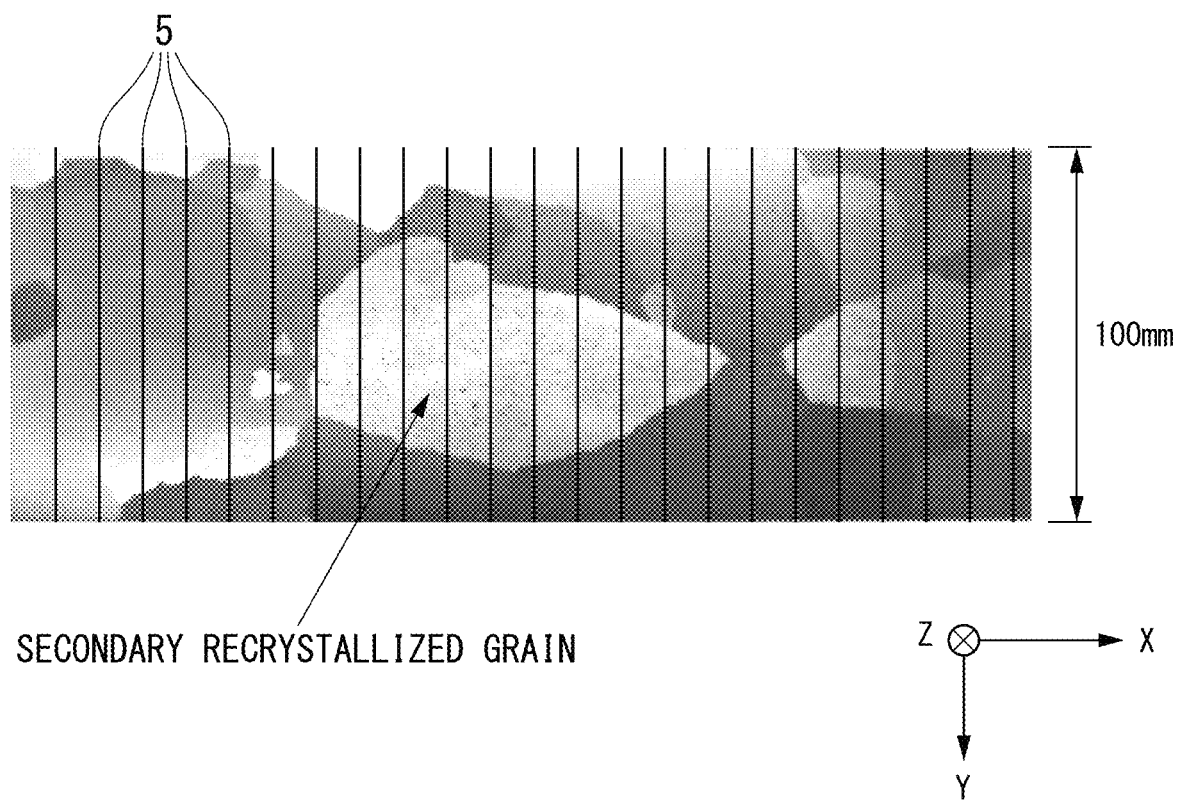
FIG. 9 is a plan view schematically illustrating a secondary recrystallized grain that exists in a steel sheet 2.

As illustrated in FIG. 9, in a case where the steel sheet 2 is seen from the sheet thickness direction Z, a grain size of a secondary recrystallized grain, which exists in the steel sheet 2, becomes approximately 100 mm to the maximum.

On the other hand, in a case where the groove 5 is seen on the transverse groove cross-section, a grain size of a crystal grain (secondary recrystallized grain), which exists on a lower side of the groove 5 in the steel sheet 2, in the sheet thickness direction becomes approximately 5 μm to the minimum, and becomes approximately the sheet thickness (for example, 0.1 to 0.4 mm) of the steel sheet 2 to the maximum. Accordingly, it is preferable that the lower limit of the grain size of the secondary recrystallized grain, which exists on a lower side of the groove 5 in the steel sheet 2, in the sheet thickness direction is set to 5 μm, and the upper limit is set to the sheet thickness of the steel sheet 2. In this manner, in a case of employing a configuration in which the melted and resolidified layer does not exist on a lower side of the groove 5, it is possible to improve bending-resistant characteristics of the grain-oriented electrical steel sheet 1.

In addition, the thickness of the insulating film 4 in a region in which the groove 5 is formed is greater than the thickness of the insulating film 4 in other regions. Accordingly, adhesiveness between the steel sheet 2 and the insulating film 4 in the region in which the groove 5 is formed becomes poorer in comparison to other regions. As a result, cracking or peeling-off is likely to occur in the insulating film 4 at the periphery of the groove 5. When cracking or peeling-off occurs in the insulating film 4, rust occurs in the steel sheet 2.

Accordingly, in this embodiment, as illustrated in FIG. 2, in a case where the groove 5 is seen on a cross-section (longitudinal groove cross-section) including the groove extension direction and the sheet thickness direction Z, an arithmetic average height Ra of a roughness curve, which constitutes the contour of the groove bottom region 5d of the groove 5, is 1 μm to 3 μm, preferably 1.2 μm to 2.5 μm, and more preferably 1.3 μm to 2.3 μm. An average length RSm of a roughness curve element, which constitutes the contour of the groove bottom region 5a, is 10 μm to 150 μm, preferably 40 μm to 145 μm, and more preferably 60 μm to 140 μm.

When surface roughness parameters (Ra and RSm) satisfy the above-described ranges, the groove bottom region 5d of the groove 5 becomes a constant rough surface. Accordingly, the adhesiveness between the steel sheet 2 and the glass film 3 or the insulating film 4 is improved due to an anchor effect. According to this, cracking or peeling-off is less likely to occur in the glass film 3 or the insulating film 4 at the periphery of the groove 5. As a result, it is possible to improve rust resistance of the grain-oriented electrical steel sheet 1.

However, as illustrated in FIG. 3, it cannot be said that the depth of the groove 5 is always constant in the width direction of the groove 5. Accordingly, it is important how to specify the groove bottom region 5d in a case where the groove 5 is seen on the longitudinal groove cross-section. Hereinafter, description will be given of an example of a method of specifying the groove bottom region 5d in a case where the groove 5 is seen on the longitudinal groove cross-section.

Figure 10:
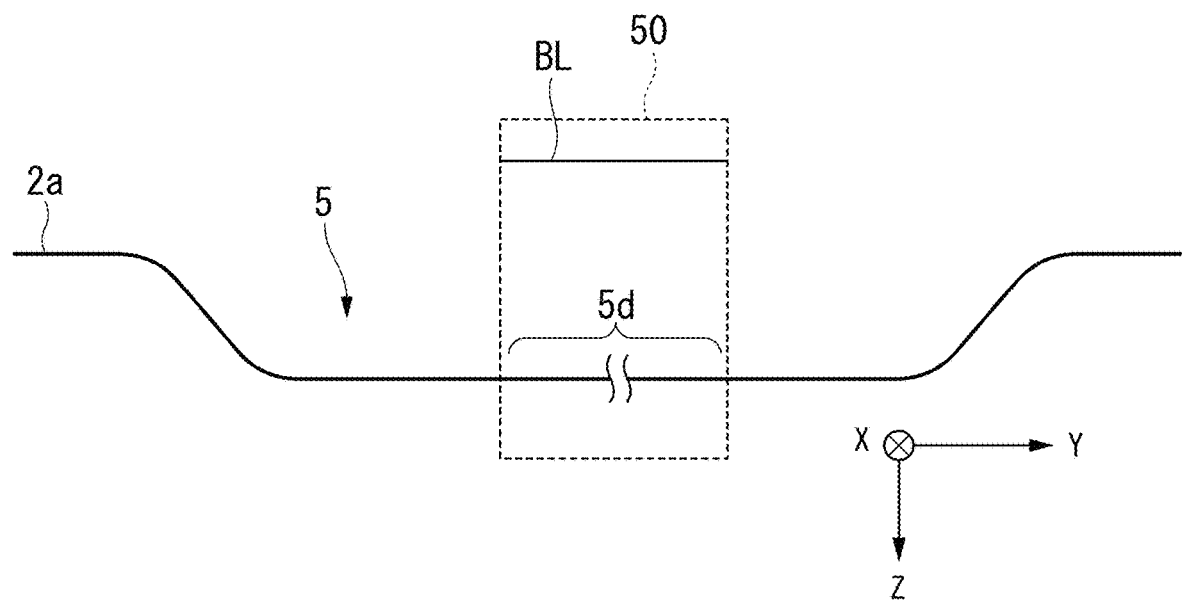
FIG. 10 is a first explanatory view relating to a method of specifying a groove bottom region 5d of the groove 5 in a longitudinal groove cross-section.

FIG. 10 is an arrow cross-sectional view taken along line C-C in FIG. 6. That is, FIG. 10 is a view when the groove 5 is seen on a longitudinal groove cross-section including the groove reference line BL and the sheet thickness direction Z. As illustrated in FIG. 10, a curve, which is obtained through conversion of a measurement cross-section curve that constitutes a contour of the groove 5 on the longitudinal groove cross-section into a waving curve, is defined as a longitudinal groove waving curve LWC. The longitudinal groove waving curve LWC is obtained as follows. After obtaining a cross-section curve by applying a low-pass filter (cut-off value: $\lambda s$) to the measurement cross-section curve obtained with respect to the groove reference line BL, a band filter (cut-off value: $\lambda f$, $\lambda c$) is applied to the cross-section curve to exclude long wavelength components and short wavelength components from the cross-section curve, thereby obtaining the longitudinal groove waving curve LWC. FIG. 10 is an arrow cross-sectional view taken along line C-C in FIG. 6. That is, FIG. 10 is a view when the groove 5 is seen on the longitudinal groove cross-section including the groove reference line BL and the sheet thickness direction Z. In this embodiment, as illustrated in FIG. 10, in a case where the groove 5 is seen on the longitudinal groove cross-section including the groove reference line BL and the sheet thickness direction Z, the contour of the groove 5 that is shown in the observation range 50 is set as the groove bottom region 5*d*.

Figure 11:
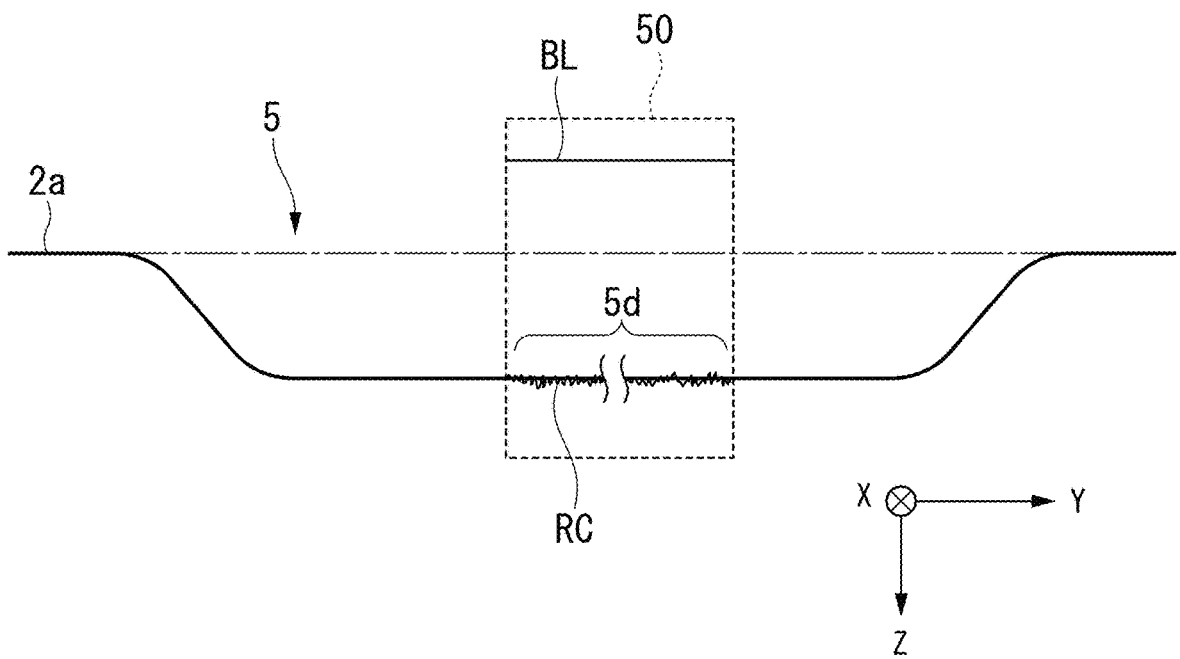
FIG. 11 is a second explanatory view relating to a method of specifying the groove bottom region 5d of the groove 5 in the longitudinal groove cross-section.

The groove bottom region 5*d* of the groove 5 is specified in accordance with the above-described method. That is, in this embodiment, as illustrated in FIG. 11, an arithmetic average height Ra of a roughness curve RC, which is obtained through conversion of a measurement cross-section curve that constitutes the contour of the groove bottom region 5*d* of the groove 5 in the observation range 50 of the longitudinal groove cross-section including the groove reference line BL and the sheet thickness direction Z, is 1 μm to 3 μm, preferably 1.2 μm to 2.5 μm, and more preferably 1.3 μm to 2.3 μm. An average length RSm of a roughness curve element, which is obtained through conversion of the measurement cross-section curve that constitutes the contour of the groove bottom region 5*d*, is 10 μm to 150 μm, preferably 40 μm to 145 μm, and still more preferably 60 μm to 140 μm. The roughness curve RC is obtained as follows. After obtaining a cross-section curve by applying a low-pass filter with a cut-off value of $\lambda s$ to a measurement cross-section curve obtained with respect to the groove reference line BL, a high-pass filter (cut-off value: $\lambda c$) is applied to the cross-section curve to exclude long wavelength components from the cross-section curve, thereby obtaining the roughness curve RC. As described above, the roughness curve RC is a contour curve that is suitable to express, particularly, surface roughness of the contour with accuracy. In addition, definition of the arithmetic average height Ra of the roughness curve RC, and the average length RSm of the roughness curve element conforms to Japanese Industrial Standard JIS B 0601 (2013).

As described above, according to the grain-oriented electrical steel sheet 1 of this embodiment, the groove 5, which satisfies the depth condition and the shape condition, is provided in the steel sheet 2. Accordingly, it is possible to make the maximization of the iron loss reducing effect and the minimization of the decrease in the magnetic flux density be compatible with each other with good valance.

In addition, according to this embodiment, a configuration, in which the melted and resolidified layer does not exist on a lower side of the groove 5 in the steel sheet 2, is employed. Accordingly, it is possible to improve bending-resistant characteristics of the grain-oriented electrical steel sheet 1.

In addition, according to this embodiment, a configuration, in which the arithmetic average height Ra of the roughness curve RC, which constitutes the contour of the groove bottom region 5*d*, is 1 μm to 3 μm, and the average length RSm of the roughness curve element is 10 μm to 150 μm, is employed. Accordingly, it is possible to improve rust resistance of the grain-oriented electrical steel sheet 1.

In addition, as illustrated in FIG. 3, this embodiment exemplifies a state in which the glass film 3 does not exist in the groove 5 (that is, a state in which the average thickness of the glass film 3 is 0 μm), but the glass film 3 of which the average thickness is greater than 0 μm and equal to or less than 5 μm, and the insulating film 4 of which the average thickness is 1 μm to 5 μm may be disposed in the groove 5. In addition, the glass film 3 of which the average thickness is 0.5 μm to 5 μm, and the insulating film 4 of which the average thickness is 1 μm to 5 μm may be disposed on the steel sheet surface 2*a*. In addition, the average thickness of the glass film 3 in the groove 5 may be smaller than the average thickness of the glass film 3 on the steel sheet surface 2*a*.

When the thickness of the glass film 3 and the insulating film 4 is set as described above, cracking or peeling-off is less likely to occur in the insulating film 4 at the periphery of the groove 5. Accordingly, the rust resistance of the grain-oriented electrical steel sheet 1 is further improved. In addition, when employing a configuration in which the glass film 3 does not exist in the groove 5 (that is, a configuration in which the average thickness of the glass film 3 in the groove 5 is 0 μm), it is possible to further reduce a distance (groove width) between groove wall surfaces which face each other. Accordingly, it is possible to further improve the iron loss reducing effect due to the groove 5.

In addition, the embodiment exemplifies the grain-oriented electrical steel sheet 1 including the glass film 3. However, since the glass film 3 is not essential constituent element as described above, even when the invention is applied to a grain-oriented electrical steel sheet constituted by only the steel sheet 2 and the insulating film 4, the same effect can be obtained. In the grain-oriented electrical steel sheet that is constituted by only the steel sheet 2 and the insulating film 4, the insulating film 4 of which the average thickness is 1 μm to 5 μm may be disposed in the groove 5, and the insulating film 4 of which the average thickness is 1 μm to 5 μm may be disposed on the steel sheet surface 2*a*.

Next, description will be given of a method of manufacturing the grain-oriented electrical steel sheet 1 according to this embodiment.

Figure 12:
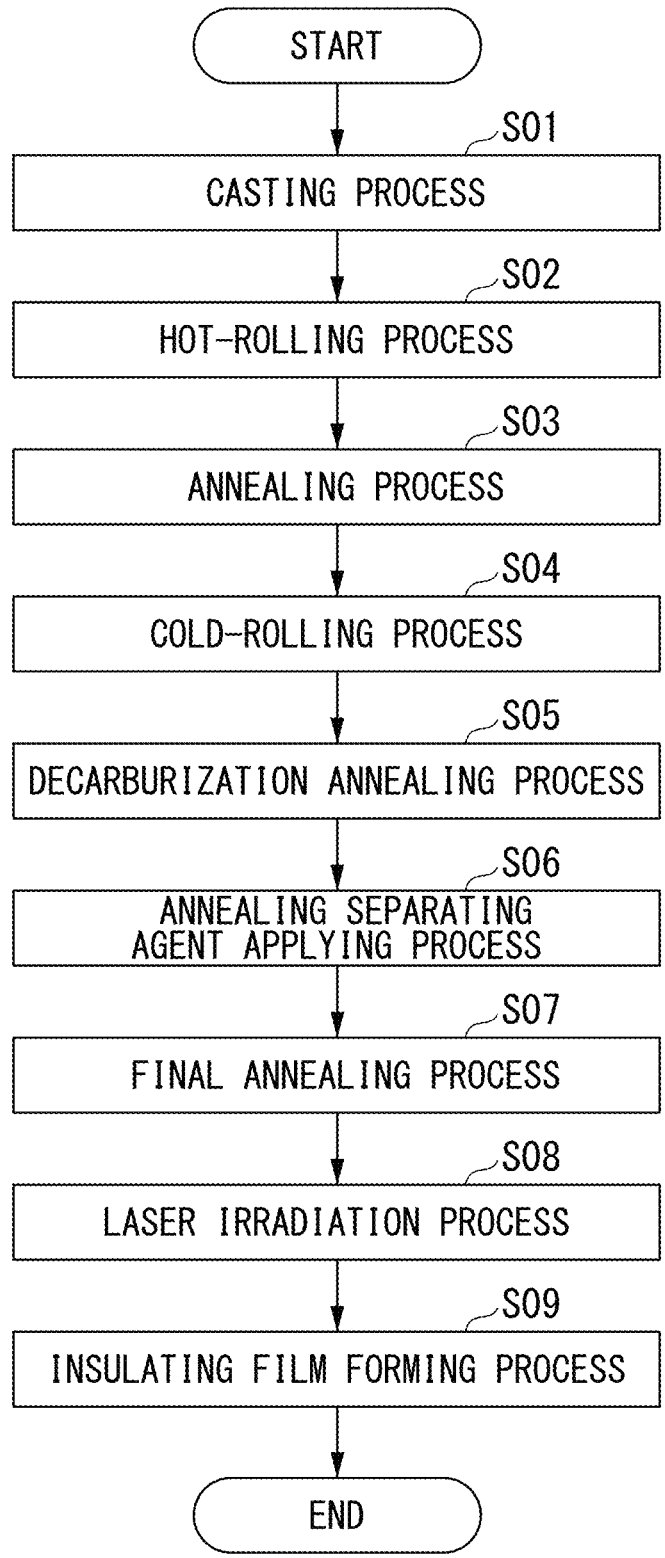
FIG. 12 is a flowchart illustrating manufacturing processes of the grain-oriented electrical steel sheet 1.

FIG. 12 is a flowchart illustrating manufacturing processes of the grain-oriented electrical steel sheet 1. As illustrated in FIG. 12, in a first casting process S01, molten steel, which has a chemical composition including, in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities, is supplied to a continuous casting machine, and a slab is continuously produced.

Subsequently, in a hot-rolling process S02, the slab obtained in the casting process S01 is heated to a predetermined temperature (for example, 1150 to 1400° C.), and hot-rolling is performed with respect to the slab. According to this, for example, a hot-rolled steel sheet having the thickness of 1.8 to 3.5 mm is obtained.

Subsequently, in an annealing process S03, an annealing treatment is performed with respect to the hot-rolled steel sheet obtained in the hot-rolling process S02 under a predetermined temperature condition (for example, a condition in which heating is performed at 750 to 1200° C. for 30 seconds to 10 minutes). Subsequently, in a cold-rolling process S04, pickling is performed with respect to a surface of the hot-rolled steel sheet that is subject to the annealing treatment in the annealing process S03, and then cold-rolling is performed with respect to the hot-rolled steel sheet. According to this, for example, a cold-rolled steel sheet having the thickness of 0.15 to 0.35 mm is obtained.

Subsequently, in a decarburization annealing process S05, a heat treatment (that is, a decarburization annealing treatment) is performed with respect to the cold-rolled steel sheet obtained in the cold-rolling process S04 under a predetermined temperature condition (for example, a condition in which heating is performed at 700 to 900° C. for 1 to 3 minutes). When the decarburization annealing treatment is performed, in the cold-rolled steel sheet, carbon is reduced to a predetermined amount or less, and primary recrystallized structure is formed. In addition, in the decarburization annealing process S05, an oxide layer, which contains silica ($SiO_2$) as a main component, is formed on a surface of the cold-rolled steel sheet.

Subsequently, in an annealing separating agent applying process S06, an annealing separating agent, which contains magnesia (MgO) as a main component, is applied to the surface (the surface of the oxide layer) of the cold-rolled steel sheet. Subsequently, in final annealing process S07, a heat treatment (that is, a final annealing treatment) is performed with respect to the cold-rolled steel sheet onto which the annealing separating agent is applied under a predetermined temperature condition (for example, a condition in which heating is performed at 1100 to 1300° C. for 20 to 24 hours). When the final annealing treatment is performed, secondary recrystallization occurs in the cold-rolled steel sheet, and the cold-rolled steel sheet is purified. As a result, it is possible to obtain a cold-rolled steel sheet which has the above-described chemical composition of the steel sheet 2 and in which a crystal orientation is controlled so that a magnetization easy axis of a crystal grain and the rolling direction X match each other (that is, the steel sheet 2 in a state before the groove 5 is formed in the grain-oriented electrical steel sheet 1).

In addition, when the final annealing treatment is performed as described above, an oxide layer containing silica as a main component reacts with the annealing separating agent that contain magnesia as a main component, and the glass film 3 including a composite oxide such as forsterite ($Mg_2SiO_4$) is formed on a surface of the steel sheet 2. In the final annealing process S07, the final annealing treatment is performed in a state in which the steel sheet 2 is coiled in a coil shape. The glass film 3 is formed on the surface of the steel sheet 2 during the final annealing treatment. Accordingly, it is possible to prevent adhering to the steel sheet 2 that is coiled in a coil shape.

Subsequently, in a laser irradiation process S08, the surface (only one surface) of the steel sheet 2, on which the glass film 3 is formed, is irradiated with a laser to form a plurality of the grooves 5, which extend in a direction intersecting the rolling direction X, in the surface of the steel sheet 2 along the rolling direction X at a predetermined interval. Hereinafter, the laser irradiation process S08 will be described in detail with reference to FIG. 13 to FIG. 15.

Figure 13:
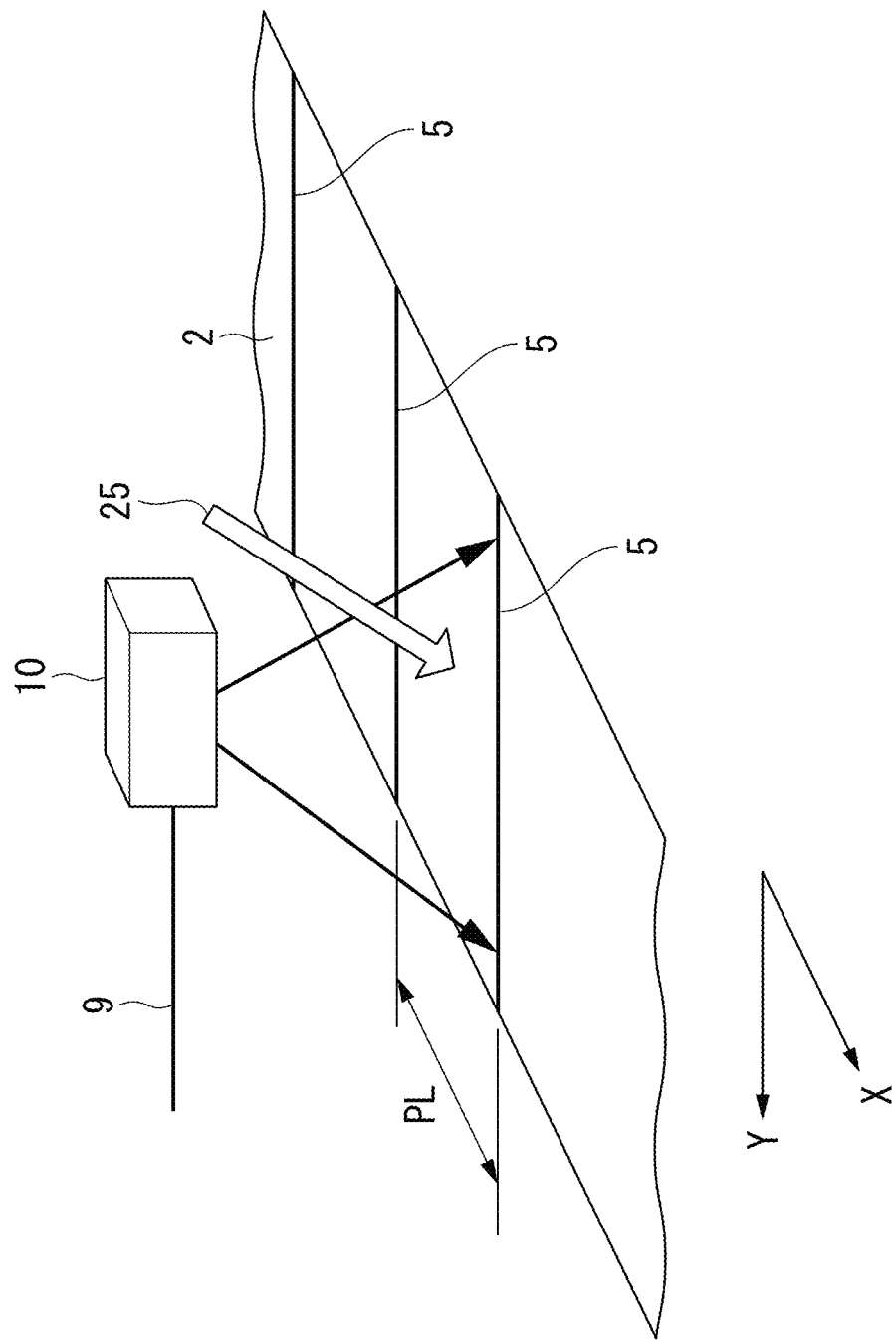
FIG. 13 is a first explanatory view relating to a laser irradiation process S08 in the manufacturing processes of the grain-oriented electrical steel sheet 1.

As illustrated in FIG. 13, in the laser irradiation process S08, laser light YL, which is emitted from a laser light source (not illustrated), is transmitted to a laser irradiation apparatus 10 through an optical fiber 9. A polygon mirror (not illustrated) and a rotary driving device (not illustrated) of the polygon mirror are embedded in the laser irradiation apparatus 10.

The laser irradiation apparatus 10 irradiates the surface of the steel sheet 2 with the laser light YL and scans the steel sheet 2 with the laser light YL in a direction that is approximately parallel to the sheet width direction Y of the steel sheet 2 due to rotation of the polygon mirror.

An assist gas 25 such as air and an inert gas is sprayed to a portion of the steel sheet 2 which is irradiated with the laser light YL in combination with the irradiation with the laser light YL. Examples of the inert gas include nitrogen, argon, and the like. The assist gas 25 plays a role of removing a component that is melted or evaporated from the steel sheet 2 with the laser irradiation. The laser light YL reaches the steel sheet 2 without being blocked by the melted or evaporated component due to the spraying of the assist gas 25. Accordingly, the groove 5 is stably formed. In addition, it is possible to suppress the component from being attached to the steel sheet 2 due to the spraying of the assist gas 25. As a result, the groove 5 is formed along a scanning line of the laser light YL. In addition, as described above, since the component is removed due to the spraying of the assist gas 25, it is possible to obtain a configuration in which the melted and resolidified layer does not exist on a lower side of the groove 5.

In the laser irradiation process S08 the surface of the steel sheet 2 is irradiated with the laser light YL while the steel sheet 2 is conveyed along a sheet travelling direction that matches the rolling direction X. Here, a rotational speed of the polygon mirror is controlled in synchronization with a conveying speed of the steel sheet 2 so that the groove 5 is formed at a predetermined interval PL along the rolling direction X. As a result, as illustrated in FIG. 13, a plurality of the grooves 5, which intersect the rolling direction X, are formed in the surface of the steel sheet 2 at the predetermined interval PL along the rolling direction X.

As the laser light source, for example, a fiber laser can be used. A high output laser such as a YAG laser, a semiconductor laser, and a $CO_2$ laser, which are typically used for industry, may be used as the laser light source. In addition, a pulse laser or a continuous wave laser may be used as the laser light source as long as the groove 5 can be stably formed. As the laser light YL, it is preferable to use a single mode laser that has a high light condensing property and is suitable for groove formation.

As irradiation conditions with the laser light YL, for example, it is preferable that a laser output is set to 200 W to 3000 W, a light-condensing spot diameter of the laser light YL in the rolling direction X (that is, a diameter including 86% of the laser output, hereinafter, referred to as 86% diameter) is set to 10 µm to 1000 µm, a light-condensing spot diameter (86% diameter) of the laser light YL in the sheet width direction Y is set to 10 µm to 1000 µm, a laser scanning speed is set to 5 m/s to 100 m/s, and a laser scanning pitch (interval PL) is set to 4 mm to 10 mm. The laser irradiation conditions may be appropriately adjusted to obtain a desired groove depth D. For example, in a case of obtaining a deep groove depth D, the laser scanning speed may be set to be slow, and the laser output may be set to be high.

Figure 14A:
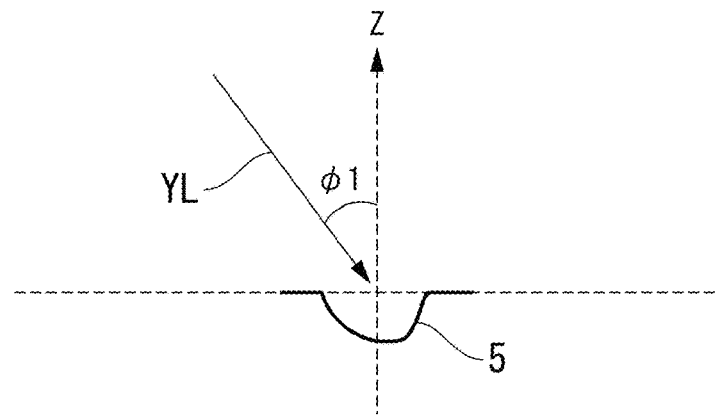
FIG. 14A is a second explanatory view relating to the laser irradiation process S08 in the manufacturing processes of the grain-oriented electrical steel sheet 1.

As illustrated in FIG. 14A, in a case where the groove 5 is seen from the laser scanning direction (groove extension direction), when an angle (laser irradiation angle) between the sheet thickness direction Z and the irradiation direction of the laser light YL is defined as $\phi1$, it is preferable that the laser irradiation angle $\phi1$ is set in a range of 10 to 45° so that the first angle $\theta1$ desired in the transverse groove cross-section of the groove 5 is obtained. According to this, it is possible to obtain a cross-sectional shape of the groove 5 in the asymmetrical shape as illustrated in FIG. 3. Furthermore, the assist gas 25 is sprayed to conform to the laser light YL. However, in a case where the laser irradiation angle $\phi1$ is set in the range, a spraying direction (spraying angle) of the assist gas 25 is not particularly limited.

Figure 14B:
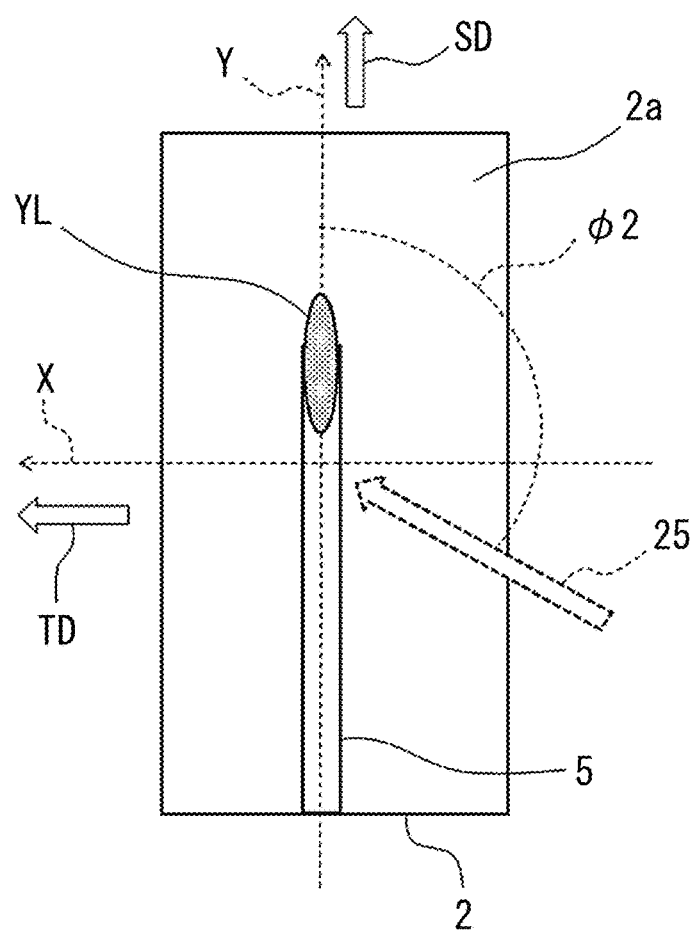
FIG. 14B is a third explanatory view relating to the laser irradiation process S08 in the manufacturing processes of the grain-oriented electrical steel sheet 1.
Figure 14C:
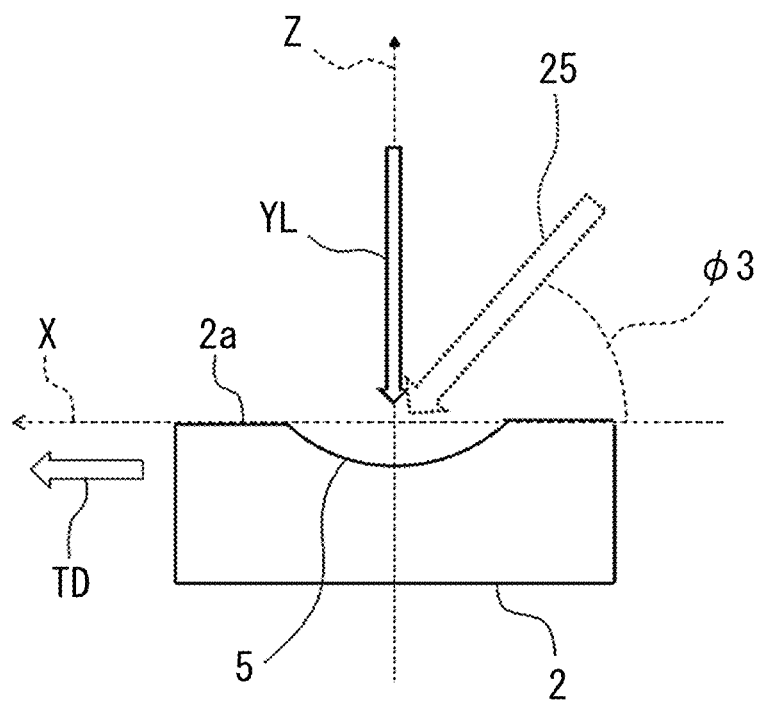
FIG. 14C is a fourth explanatory view relating to the laser irradiation process S08 in the manufacturing processes of the grain-oriented electrical steel sheet 1.

On the other hand, when the spraying direction of the assist gas 25 is set as follows, it is possible to obtain the cross-sectional shape of the groove 5 in the asymmetrical shape as illustrated in FIG. 3. As illustrated in FIG. 14B, in a plan view of the steel sheet 2 that is conveyed along the sheet travelling direction TD that is parallel to the rolling direction X, the assist gas 25 is sprayed to conform to the laser light YL from a direction having an inclination of an angle $\phi 2$ with respect to the laser scanning direction SD (direction parallel to the sheet width direction Y) of the laser light YL. In addition, as illustrated in FIG. 14C, when the steel sheet 2 that is transferred along the sheet travelling direction TD is seen from the sheet width direction Y (laser scanning direction SD), the assist gas 25 is sprayed to conform the laser light YL from a direction having an inclination of an angle $\phi 3$ with respect to the steel sheet surface 2a. It is preferable that the angle $\phi 2$ is set in a range of 90° to 180°, and the angle $\phi 3$ is set in a range of 1° to 85°.

In addition, it is preferable to perform an atmosphere control so that the amount of particles, which exist in a sheet travelling atmosphere of the steel sheet 2 and have a diameter of 0.5 μm or greater, becomes equal to or greater than 10 pieces and less than 10000 pieces per 1 CF (cubic feet).

Particularly, when the assist gas spraying angle $\phi 2$ with respect to the laser scanning direction and the assist gas spraying angle $\phi 3$ with respect to the steel sheet surface 2a are set in the above-described ranges, it is possible to control the cross-sectional shape of the groove 5 as the asymmetrical shape illustrated in FIG. 3, and it is possible to control the surface roughness (Ra, RSm) of the groove bottom region 5d with accuracy. In addition to this, when the amount of the particles, which exist in the sheet travelling atmosphere and have a diameter of 0.5 μm or greater, is set in the above-described range, it is possible to control the surface roughness (particularly, RSm) of the groove bottom region 5d with more accuracy. In addition, it is preferable to set a flow rate of the assist gas 25 in a range of 10 to 1000 liters/minute. However, in a case where the flow rate of the assist gas 25 is 50 liters/minute or less, the melted and resolidified layer is likely to occur on a lower side of the groove 5. Accordingly, it is more preferable that the lower limit of the flow rate of the assist gas 25 is greater than 50 liters/minute.

In the related art, in a case of forming a groove with laser irradiation, an assist gas is sprayed toward a steel sheet surface to conform to a laser from a direction (sheet thickness direction) that is perpendicular to a steel sheet surface so as to efficiently form a groove having a rectangular cross-section (that is, a groove having a bilaterally symmetrical shape). The present inventors have made a thorough investigation with respect to the configuration, and they obtained the following finding. When the irradiation direction with the laser light YL and the spraying direction of the assist gas 25 are three-dimensionally defined as illustrated in FIG. 14A to FIG. 14C, it is possible to control the cross-sectional shape of the groove 5 as the symmetrical shape satisfying Expression (1) to Expression (3) with accuracy. In addition, when the amount of particles in the sheet travelling atmosphere during laser irradiation is defined, it is possible to control the surface roughness (Ra, RSm) of the groove bottom region 5d with accuracy.

In addition, the present inventors have obtained the following finding. When the groove having the symmetrical shape, which satisfies Expression (1) to Expression (3), is formed in the grain-oriented electrical steel sheet in accordance with the above-described novel manufacturing method, it is possible to make the maximization of the iron loss reducing effect and the minimization of the decrease in the magnetic flux density be compatible with each other with good balance, and the rust resistance can be further improved. The present inventors have accomplished the present invention on the basis of the findings. Accordingly, the method of manufacturing the grain-oriented electrical steel sheet according to this embodiment (particularly, the laser irradiation process) is a novel manufacturing method that is not predicted by those skilled in the art, and the grain-oriented electrical steel sheet 1 that is obtained according to the manufacturing method also has a novel configuration (the cross-sectional shape of the groove 5 and the surface roughness of the groove bottom region 5d) that cannot be predicted by those skilled in the art.

Figure 15:
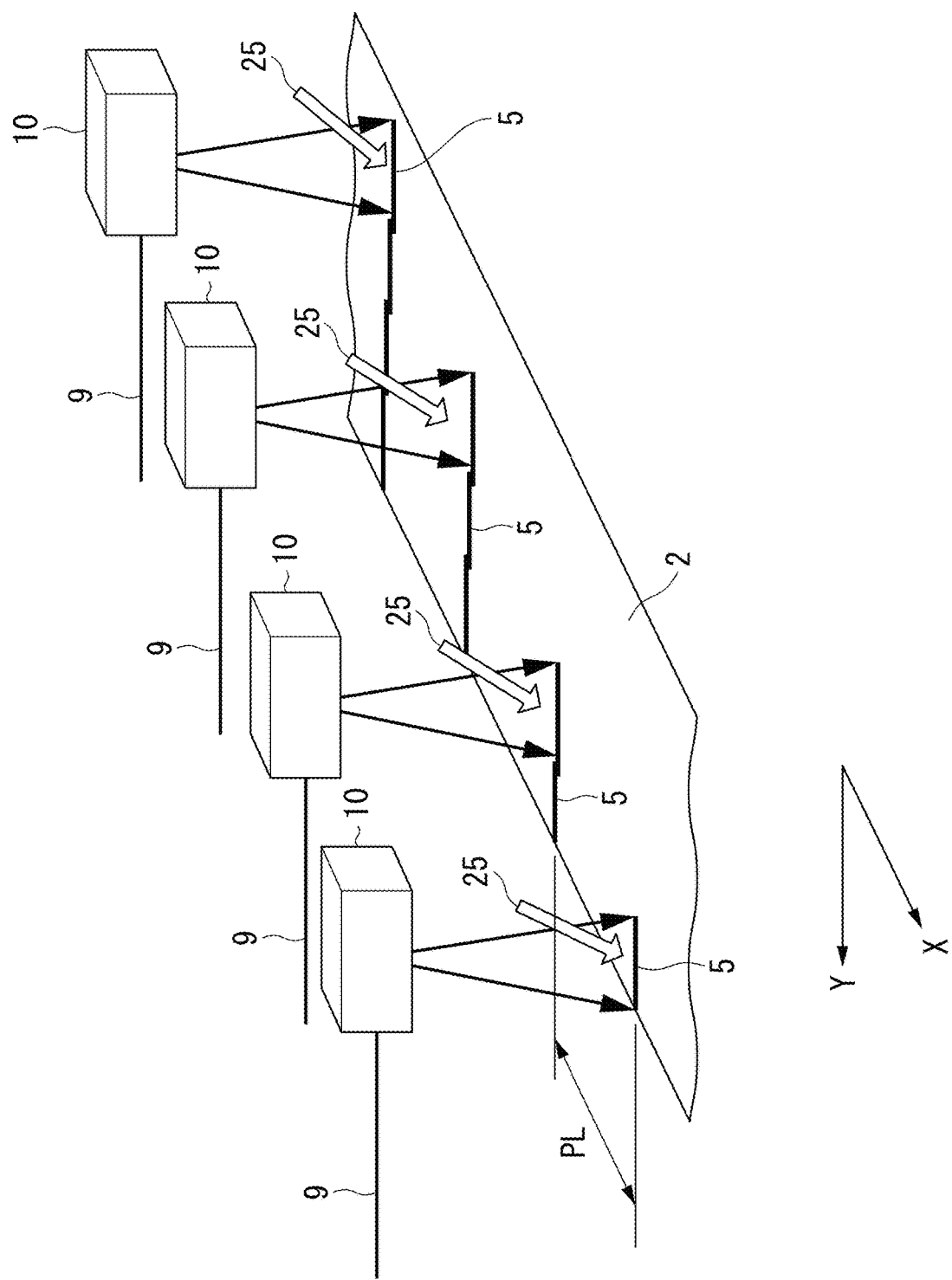
FIG. 15 is a fifth explanatory view relating to the laser irradiation process S08 in the manufacturing processes of the grain-oriented electrical steel sheet 1.

In a case where it is difficult to form the groove 5 in the entirety of the steel sheet 2 in the sheet width direction Y with one laser irradiation apparatus 10, as illustrated in FIG. 15, the groove 5 may be formed in the entirety of the steel sheet 2 in the sheet width direction Y by using a plurality of the laser irradiation apparatuses 10. In this case, as illustrated in FIG. 15, the plurality of laser irradiation apparatuses 10 are disposed along the rolling direction X at a predetermined interval. In addition, when seen from the rolling direction X, positions of the respective laser irradiation apparatuses 10 in the sheet width direction Y are set so that laser scanning lines of the respective laser irradiation apparatuses 10 do not overlap each other. When employing the laser irradiation method illustrated in FIG. 15, it is possible to form a plurality of the grooves 5 as illustrated in FIG. 1 in the steel sheet surface 2a.

Returning to FIG. 12, in a final insulating film forming process S09, for example, an insulating coating solution containing colloidal silica and a phosphate is applied to the steel sheet surface 2a, in which the groove 5 is formed in accordance with the laser irradiation process S08, from an upper side of the glass film 3. Then, when a heat treatment is performed under a predetermined temperature condition (for example, 840 to 920° C.), it is possible to finally obtain the grain-oriented electrical steel sheet 1 including the steel sheet 2 in which the groove 5 is formed, the glass film 3, and the insulating film 4 as illustrated in FIGS. 1 to 3.

The steel sheet 2 of the grain-oriented electrical steel sheet 1 manufactured as described above contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

Furthermore, the embodiment exemplifies a case of employing a manufacturing process in which the groove 5 is formed in the steel sheet surface 2a through laser irradiation before the insulating film 4 is formed in the steel sheet surface 2a, and then the insulating film 4 is formed in the steel sheet surface 2a. This embodiment is not limited thereto, and may employ a manufacturing process in which after the insulating film 4 is formed in the steel sheet surface 2a, the steel sheet surface 2a is irradiated with the laser light YL from an upper side of the insulating film 4 to form the groove 5 in the steel sheet surface 2a. In this case, the groove 5 immediately after the laser irradiation is exposed to the outside. Accordingly, it is necessary to form the insulating film 4 on the steel sheet 2 after forming the groove 5.

Alternatively, in this embodiment, the glass film 3 or the insulating film 4 may be formed after the groove 5 is formed in the steel sheet 2.

Accordingly, the grain-oriented electrical steel sheet 1, for which high-temperature annealing for secondary recrystallization is completed and coating of the glass film 3 and the insulating film 4 is completed, is included in the grain-oriented electrical steel sheet according to this embodiment, and a grain-oriented magnetic steel sheet before completion of coating of the glass film 3 or the insulating film 4 and after formation of the groove 5 is also included in the grain-oriented electrical steel sheet. That is, a final product may be obtained by performing formation of the glass film 3 or the insulating film 4 as a post process by using the grain-oriented electrical steel sheet according to this embodiment. Furthermore, as described above, in a case of removing the glass film 3 or the insulating film 4 from the grain-oriented electrical steel sheet 1 in which the glass film 3 or the insulating film 4 is formed in accordance with the above-described film removing method, it is confirmed that the shape or the roughness of the groove 5 is approximately the same as those before forming the glass film 3 or the insulating film 4.

Furthermore, the embodiment exemplifies a case of performing the laser irradiation process S08 after the final annealing process S07, but the laser irradiation process may be performed between the cold-rolling process S04 and the decarburization annealing process S05. That is, when performing the laser irradiation and the assist gas spraying with respect to the cold-rolled steel sheet that is obtained in the cold-rolling process S04, after forming the groove 5 in the steel sheet surface 2a of the cold-rolled steel sheet, the decarburization annealing may be performed with respect to the cold-rolled steel sheet.

EXAMPLES

Hereinafter, an effect of an aspect of the invention will be described more specifically with reference to examples, but a condition in Examples is one conditional example that is employed to confirm operability and an effect of the invention, and the invention is not limited to the one conditional example. The invention may employ various conditions as long as the object of the invention is accomplished without departing from the gist of the invention.

(Verification 1 of Balance Between Maximization of Iron Loss Reducing Effect and Minimization of Decrease in Magnetic Flux Density)

First, a grain-oriented electrical steel sheet used in Verification 1 was manufactured as follows.

Hot-rolling was performed with respect to a slab having a chemical composition containing, in terms of mass fraction, Si: 3.0%, C: 0.08%, acid-soluble Al: 0.05%, N: 0.01%, Mn: 0.12%, Cr: 0.05%, Cu: 0.04%, P: 0.01%, Sn: 0.02%, Sb: 0.01%, Ni: 0.005%, S: 0.007%, Se: 0.001%, and the remainder including Fe and unavoidable impurities to obtain a hot-rolled steel sheet having the thickness of 2.3 mm.

Subsequently, an annealing treatment was performed with respect to the hot-rolled steel sheet under a temperature condition in which heating was performed at 1000° C. for one minute. Pickling was performed with respect to a surface of the hot-rolled steel sheet that was subjected to the annealing treatment, and then cold-rolling was performed with respect to the hot-rolled steel sheet to obtain a cold-rolled steel sheet having the thickness of 0.23 mm. Subsequently, a decarburization annealing treatment was performed with respect to the cold-rolled steel sheet under a temperature condition in which heating was performed at 800° C. for two minutes, and then an annealing separating agent containing magnesia (MgO) as a main component was applied onto the surface of the cold-rolled steel sheet.

Subsequently, a final annealing treatment was performed with respect to the cold-rolled steel sheet onto which the annealing separating agent was applied under a temperature condition in which heating was performed at 1200° C. for 20 hours. As a result, a cold-rolled steel sheet (steel sheet in which a glass film was formed on a surface thereof), which has the above-described chemical composition and in which a crystal orientation is controlled so that the magnetization easy axis of a crystal grain and the rolling direction match each other, was obtained.

Subsequently, as described above, the steel sheet surface, on which the glass film was formed, was irradiated with a laser. According to this, a plurality of grooves, which extends in a direction intersecting the rolling direction, were formed in the steel sheet surface at a predetermined interval along the rolling direction.

As irradiation conditions of the laser light YL, a laser output was adjusted in a range of 200 W to 3000 W, a light-condensing spot diameter (86% diameter) of the laser light YL in the rolling direction X was adjusted in a range of 10 μm to 1000 μm, a light-condensing spot diameter (86% diameter) of the laser light YL in the sheet width direction Y was adjusted in a range of 10 μm to 1000 μm, a laser scanning speed was adjusted in a range of 5 m/s to 100 m/s, and a laser scanning pitch (interval PL) was adjusted in a range of 4 mm to 10 mm so as to obtain the desired groove depth D.

In addition, the assist gas spraying angle φ2 with respect to the laser scanning direction was adjusted in a range of 90° to 180°, and the assist gas spraying angle φ3 with respect to the steel sheet surface was adjusted in a range of 1° to 85° so as to obtain the first angle θ1 and the second angle θ2 which are desired in the transverse groove cross-section of the groove 5.

As described above, the insulating coating solution containing colloidal silica and a phosphate was applied to the steel sheet in which the groove was formed from an upper side of the glass film, and a heat treatment was performed under a temperature condition in which heating was performed at 850° C. for one minute. According to this, a grain-oriented electrical steel sheet including the steel sheet in which the groove was formed, the glass film, and the insulating film was finally obtained.

The steel sheet (steel sheet in which the groove was formed) in the grain-oriented electrical steel sheet, which was finally obtained, mainly contained Si: 3.0%.

According to the above-described processes, as illustrated in Table 1, grain-oriented electrical steel sheets, which are different in the average groove depth D (unit: μm) and the groove width W (unit: μm), were prepared as grain-oriented electrical steel sheets corresponding to Test Nos. 1 to 8. In the entirety of the grain-oriented electrical steel sheet corresponding to Test Nos. 1 to 8, when the groove 5 was seen on the transverse groove cross-section, the first angle θ1 was set to 45° and the second angle θ2 was set to 60°.

The grain-oriented electrical steel sheets corresponding to Test Nos. 3 to 7 are grain-oriented electrical steel sheets of present examples which satisfy a condition (Condition 1) in which the average groove depth D is greater than 10 μm and equal to or less than 40 μm, a condition (Condition 2) in which the first angle θ1 is 0° to 50°, a condition (Condition 3) in which the second angle θ2 is greater than the first angle θ1 and is 75° or less, and a condition (Condition 4) in which a difference value (θ2−θ1) between the second angle θ2 and the first angle θ1 is 10° or greater. The grain-oriented electrical steel sheets corresponding to Test Nos. 1, 2, and 8 are grain-oriented electrical steel sheets of comparative examples which satisfy only Condition 2 to Condition 4. In the entirety of the grain-oriented electrical steel sheets corresponding to Test Nos. 1 to 8, the existence rate α of the groove asymmetrical region in the groove extension direction was 70% or greater. Furthermore, in examples, the laser irradiation conditions were adjusted in the range described in the embodiment. In comparative examples, the laser irradiation conditions deviated from the range.

An iron loss W17/50 and a decrease amount ΔB8 of a magnetic flux density B8 were measured with respect to each of the grain-oriented electrical steel sheets corresponding to Test Nos. 1 to 8. The measurement results are illustrated in Table 1. Furthermore, the iron loss W17/50 represents an energy loss per unit weight (unit: W/kg) which is measured under excitation conditions of a magnetic flux density of 1.7 T and a frequency of 50 Hz with respect to a test piece (for example, a test piece of 100 mm×500 mm) of the grain-oriented electrical steel sheets. In addition, the decrease amount ΔB8 of a magnetic flux density B8 is a value (unit: G) obtained by subtracting a magnetic flux density B8 measured after groove formation from a magnetic flux density B8 measured before groove formation. The magnetic flux density B8 before groove formation was 1.910 T (=19100 G), and the iron loss W17/50 before groove formation was 0.97 W/kg.

As illustrated in Table 1, in the grain-oriented electrical steel sheets of comparative examples (the average groove depth D is 10 μm or less) corresponding to Test Nos. 1 and 2, the iron loss W17/50 hardly varies in comparison to the iron loss before groove formation (that is, the iron loss improving effect is small). In addition, in the grain-oriented electrical steel sheet of a comparative example (the average groove depth D is greater than 40 μm) corresponding to Test No. 8, the decrease amount ΔB8 of the magnetic flux density B8 is very great (that is, an effect of suppressing a decrease in the magnetic flux density B8 is small).

On the other hand, as illustrated in Table 1, in the grain-oriented electrical steel sheets of present examples corresponding to Test Nos. 3 to 7, the iron loss W17/50 greatly decreases (that is, the iron loss improving effect is greater) in comparison to the iron loss before groove formation, and the decrease amount ΔB8 of the magnetic flux density B8 is suppressed to a relatively small value (that is, the effect of suppressing the decrease in the magnetic flux density B8 is great). According to this Verification 1 as described above, it was confirmed that it is necessary to satisfy the entirety of Conditions 1 to 4 so as to make the maximization of the iron loss reducing effect and the minimization of the decrease in the magnetic flux density be compatible with each other with good balance.

TABLE 1

| No. | D (μm) | W (μm) | θ1 (degree) | θ2 (degree) | W17/50 (W/kg) | ΔB8 (G) | Remark |
|---|---|---|---|---|---|---|---|
| 1 | 8 | 25 | 45 | 60 | 0.980 | 0 | Comparative Example |
| 2 | 10 | 30 | 45 | 60 | 0.960 | 10 | Comparative Example |
| 3 | 12 | 35 | 45 | 60 | 0.790 | 10 | Present Example |
| 4 | 20 | 60 | 45 | 60 | 0.750 | 30 | Present Example |
| 5 | 25 | 70 | 45 | 60 | 0.755 | 30 | Present Example |
| 6 | 30 | 85 | 45 | 60 | 0.770 | 60 | Present Example |
| 7 | 40 | 110 | 45 | 60 | 0.790 | 80 | Present Example |
| 8 | 45 | 130 | 45 | 60 | 0.900 | 150 | Comparative Example |

(Verification 2 of Balance Between Maximization of Iron Loss Reducing Effect and Minimization of Decrease in Magnetic Flux Density)

Next, as illustrated in Table 2, as grain-oriented electrical steel sheets corresponding to Test Nos. 9 to 14, grain-oriented electrical steel sheets, which are different in a combination of the first angle θ1 and the second angle θ2, were prepared in the same process as in Verification 1. In the entirety of the grain-oriented electrical steel sheets corresponding to Test Nos. 9 to 14, the average groove depth D was set to 20 μm and the groove width W was set to 70 μm.

Grain-oriented electrical steel sheets corresponding to Test Nos. 11 to 13 are grain-oriented electrical steel sheet of present examples which satisfy the entirety of Conditions 1 to 4. The grain-oriented electrical steel sheets corresponding to Test Nos. 9 and 10 are grain-oriented electrical steel sheets of comparative examples which satisfy only Condition 1. The grain-oriented electrical steel sheet corresponding to Test No. 14 is a grain-oriented electrical steel sheet of a comparative example that satisfies only Conditions 1 to 3. As is the case with Verification 1, the iron loss W17/50 and the decrease amount ΔB8 of the magnetic flux density B8 were measured with respect to each of the grain-oriented electrical steel sheets corresponding to Test Nos. 9 to 14. The measurement results are illustrated in Table 2.

As illustrated in Table 2, in the grain-oriented electrical steel sheets of present examples corresponding to Test Nos. 11 to 13, the iron loss W17/50 greatly decreases (that is, the iron loss improving effect is greater) in comparison to the iron loss before groove formation, and the decrease amount ΔB8 of the magnetic flux density B8 is suppressed to a relatively small value (that is, the effect of suppressing the decrease in the magnetic flux density B8 is great).

On the other hand, in the grain-oriented electrical steel sheets (θ1>50°) of comparative examples corresponding to Test Nos. 9 and 10, the iron loss improving effect is smaller in comparison to Test Nos. 11 to 13. In addition, in the grain-oriented electrical steel sheet of a comparative example (θ1=θ2) corresponding to Test No. 14, the iron loss improving effect is approximately the same as in Test Nos. 11 to 13, but the decrease amount ΔB8 of the magnetic flux density B8 is greater (that is, the effect of suppressing the decrease in the magnetic flux density B8 is smaller) in comparison to Test Nos. 11 to 13. According to this Verification 2 as described above, it was confirmed that it is necessary to satisfy the entirety of Conditions 1 to 4 so as to make the maximization of the iron loss reducing effect and the minimization of the decrease in the magnetic flux density be compatible with each other with good balance.

In addition, in a grain-oriented electrical steel sheet of present example corresponding to Test No. 11-2, and a electrical steel sheet of a comparative example corresponding to Test No. 11-3, θ2 was increased in the same θ1 condition as Test No. 11.

In Test No. 11-3) ($\theta 2 > 75°$) in which $\theta 2$ does not satisfy Condition 3, the decrease amount $\Delta B8$ of the magnetic flux density B8 is great (that is, the effect of suppressing the decrease in the magnetic flux density B8 is small). According to this Verification 2 as described above, it was confirmed that it is necessary to satisfy the entirety of Conditions 1 to 4 so as to make the maximization of the iron loss reducing effect and the minimization of the decrease in the magnetic flux density be compatible with each other with good balance.

TABLE 2

| No. | D (μm) | W (μm) | θ1 (degree) | θ2 (degree) | W17/50 (W/kg) | ΔB8 (G) | Remark |
|---|---|---|---|---|---|---|---|
| 9 | 20 | 70 | 60 | 60 | 0.830 | 20 | Comparative Example |
| 10 | 20 | 70 | 55 | 60 | 0.820 | 30 | Comparative Example |
| 11 | 20 | 70 | 50 | 60 | 0.760 | 20 | Present Example |
| 12 | 20 | 70 | 20 | 60 | 0.750 | 30 | Present Example |
| 13 | 20 | 70 | 5 | 60 | 0.745 | 30 | Present Example |
| 14 | 20 | 70 | 45 | 45 | 0.750 | 60 | Comparative Example |
| 11-2 | 20 | 100 | 50 | 75 | 0.765 | 60 | Present Example |
| 11-3 | 20 | 150 | 50 | 80 | 0.770 | 150 | Comparative Example |

(Verification 3 of Balance Between Maximization of Iron Loss Reducing Effect and Minimization of Decrease in Magnetic Flux Density)

Next, as illustrated in Table 3, as grain-oriented electrical steel sheets corresponding to Test Nos. 15 to 18, grain-oriented electrical steel sheets, which are different in the average groove depth D, the groove width W, and a combination of the first angle $\theta 1$ and the second angle $\theta 2$, were prepared in the same process as in Verification 1. In the grain-oriented electrical steel sheets corresponding to Test Nos. 15 and 16, the average groove depth D was set to 15 μm, and the groove width W was set to 45 μm. In the grain-oriented electrical steel sheets corresponding to Test Nos. 17 and 18, the average groove depth D was set to 25 μm, and the groove width W was set to 70 μm.

The grain-oriented electrical steel sheets corresponding to Test Nos. 15 and 17 are grain-oriented electrical steel sheets of present examples which satisfy the entirety of Conditions 1 to 4. The grain-oriented electrical steel sheets corresponding to Test Nos. 16 and 18 are grain-oriented electrical steel sheets of comparative examples which satisfy only Conditions 1 to 3. As is the case with Verification 1, the iron loss W17/50 and the decrease amount $\Delta B8$ of the magnetic flux density B8 were measured with respect to each of the grain-oriented electrical steel sheets corresponding to Test Nos. 15 to 18. The measurement results are illustrated in Table 3.

As illustrated in Table 3, in the same average groove depth D, the iron loss improving effect is also the same in each case. However, in a case where the cross-sectional shape of the groove is asymmetrical ($\theta 1 < \theta 2$), the decrease amount $\Delta B8$ of the magnetic flux density B8 is smaller (that is, the effect of suppressing the decrease in the magnetic flux density B8 is greater) in comparison to a case where the cross-sectional shape of the groove (shape of the transverse groove waving curve) is symmetrical (in a case where $\theta 1 = \theta 2$). According to this Verification 3 as described above, it was confirmed that it is necessary to satisfy the entirety of Conditions 1 to 4 so as to make the maximization of the iron loss reducing effect and the minimization of the decrease in the magnetic flux density be compatible with each other with good balance.

TABLE 3

| No. | D (μm) | W (μm) | θ1 (degree) | θ2 (degree) | W17/50 (W/kg) | ΔB8 (G) | Remark |
|---|---|---|---|---|---|---|---|
| 15 | 15 | 45 | 45 | 60 | 0.770 | 10 | Present Example |
| 16 | 15 | 45 | 45 | 45 | 0.770 | 30 | Comparative Example |
| 17 | 25 | 70 | 45 | 60 | 0.755 | 30 | Present Example |
| 18 | 25 | 70 | 45 | 45 | 0.755 | 60 | Comparative Example |

(Verification of Bending-Resistant Characteristics)

Next, as illustrated in Table 4, as grain-oriented electrical steel sheets corresponding to Test Nos. 19 and 20, grain-oriented electrical steel sheets, which are different in presence or absence of the fine grain layer (melted and resolidified layer) on a lower side of the groove, were prepared in the same process as Verification 1. In the grain-oriented electrical steel sheets corresponding to Test Nos. 19 and 20, the average groove depth D was set to 20 μm, the groove width W was set to 70 μm, the first angle $\theta 1$ was set to 45°, and the second angle $\theta 2$ was set to 60°.

In the laser irradiation process S08 illustrated in FIG. 12, the presence or absence of the fine grain layer on the lower side of the groove was controlled by approximately adjusting the flow rate of the assist gas 25 in a range of 10 liters/minute to 1000 liters/minutes. Furthermore, absence of the fine grain layer represents that a condition (Condition 5) is satisfied. Specifically, in Condition 5, a sheet-width-direction grain size of a secondary recrystallized grain, which exists on a lower side of the groove, is set to be equal to or greater than 5 μm and equal to or less than a sheet thickness of a steel sheet. That is, the grain-oriented electrical steel sheet corresponding to Test No. 19 is a grain-oriented electrical steel sheet of a comparative example that satisfies Conditions 1 to 4, and does not satisfy Condition 5. The grain-oriented electrical steel sheet corresponding to Test No. 20 is a grain-oriented electrical steel sheet of present example that satisfies the entirety of Conditions 1 to 5.

The assist gas flow rate was set to 40 liters/minute in Test No. 19, and 500 liters/minute in Test No. 20, thereby controlling presence or absence of the melted layer.

A repeated bending test was performed five times with respect to each of the grain-oriented electrical steel sheets corresponding to Test Nos. 19 and 20 to confirm whether or not fracture occurred at the periphery of the groove. As a result, in the grain-oriented electrical steel sheet of present example corresponding to Test No. 20, fracture did not occur at the periphery of the groove. Through the verification, it was confirmed that the bending characteristics of the grain-oriented electrical steel sheet are improved when satisfying Condition 5 in addition to Conditions 1 to 4.

TABLE 4

| No. | D (μm) | W (μm) | θ1 (degree) | θ2 (degree) | Groove bottom fine grain layer | Bending characteristic | Remark |
|---|---|---|---|---|---|---|---|
| 19 | 20 | 70 | 45 | 60 | Present | X | Comparative Example |
| 20 | 20 | 70 | 45 | 60 | Absent | ○ | Present Example |

(Verification 1 of Rust Resistance)

Next, rust resistance of a grain-oriented electrical steel sheet, which satisfies Conditions 1 to 4 described above, and Conditions 6 and 7 to be described below, was verified.

(Condition 6)

In a case where the groove is seen on the longitudinal groove cross-section, the arithmetic average height Ra of a roughness curve that constitutes the contour of the groove bottom region of the groove is 1 μm to 3 μm.

(Condition 7)

In a case where the groove is seen on the longitudinal groove cross-section, the average length RSm of the roughness curve element that constitutes the contour the groove bottom region of the groove is 10 μm to 150 μm.

As illustrated in Table 5, as present examples 1 to 8, grain-oriented electrical steel sheets, which satisfy Conditions 1 to 4 and Conditions 6 and 7, were prepared in the same process as in Verification 1. In addition, as comparative examples 1 to 4, grain-oriented electrical steel sheets, which satisfy Conditions 1 to 4 and do not satisfy at least one of Conditions 6 and 7, were prepared in the same process as in Verification 1. Furthermore, in the entirety of present examples 1 to 8 and comparative examples 1 to 4, the average groove depth D was set to be greater than 10 μm and equal to or less than 40 μm, the first angle θ1 was set to 0° to 50°, the second angle θ2 was set to be greater than the first angle θ1 and equal to or less than 75°, and the groove width W was set to 10 μm to 250 μm.

In the laser irradiation process S08 illustrated in FIG. 12, the assist gas spraying angle φ2 with respect to the laser scanning direction, the assist gas spraying angle φ3 with respect to the steel sheet surface, the flow rate of the assist gas 25, and the amount of particles in the sheet travelling atmosphere were adjusted in the ranges described in the embodiment, thereby obtaining a grain-oriented electrical steel sheet that satisfies Condition 6 and Condition 7. Particularly, it is possible to control the surface roughness in the groove bottom region with accuracy through adjustment of the assist gas spraying angles φ2 and φ3, and the amount of particles in the sheet travelling atmosphere.

Furthermore, the groove bottom region of the groove was specified with respect to each of the grain-oriented electrical steel sheets corresponding to Examples 1 to 8 and Comparative Examples 1 to 4 in accordance with the specifying method described in the embodiment. A laser type surface roughness measuring device (VK-9700, manufactured by Keyence Corporation) was used for measurement of the surface roughness parameters (Ra, RSm) representing the surface roughness in the groove bottom region.

Verification of the rust resistance was performed with respect to each of the grain-oriented electrical steel sheets corresponding to Present Examples 1 to 8 and Comparative Examples 1 to 4. Specifically, a test piece having a dimension of 30 mm per one side was collected from each of the grain-oriented electrical steel sheets, the test piece was left as it was for one week in an atmosphere of a temperature of 50° C. and a humidity of 91%, and evaluation was made on the basis of a variation of weight of the test piece before being left and after being left. When rust occurs, the weight of the test piece increases. Accordingly, as the weight increase amount was smaller, the rust resistance was determined as good. Specifically, the rust resistance of the test piece in which the weight increase amount was 5.0 mg/m$^2$ or less was evaluated as "good", and the rust resistance of the test piece in which the weight increase amount was greater than 10.0 mg/m$^2$ was evaluated as "poor". As illustrated in Table 5, from a result of the verification of the rust resistance of the grain-oriented electrical steel sheets corresponding to Present Examples 1 to 8, since a configuration satisfying Condition 6 and Condition 7 was employed, it was confirmed that the rust resistance of the grain-oriented electrical steel sheets was improved.

TABLE 5

| | Ra (μm) | RSm (μm) | Rust resistance |
|---|---|---|---|
| Present Example 1 | 3 | 10 | Good |
| Present Example 2 | 1.5 | 30 | Good |
| Present Example 3 | 2.1 | 50 | Good |
| Present Example 4 | 1.8 | 60 | Good |
| Present Example 5 | 2.6 | 20 | Good |
| Present Example 6 | 2.4 | 40 | Good |
| Present Example 7 | 1.3 | 130 | Good |
| Present Example 8 | 1 | 150 | Good |
| Comparative Example 1 | 0.8 | 40 | Poor |
| Comparative Example 2 | 4.1 | 10 | Poor |
| Comparative Example 3 | 3.5 | 5 | Poor |
| Comparative Example 4 | 0.8 | 6 | Poor |

(Verification 2 of Rust Resistance)

Next, as illustrated in Table 6, a grain-oriented electrical steel sheet, which satisfies Conditions 1 to 4, satisfies Conditions 6 and 7 and does not include the glass film, was prepared as Present Example 9 by using a known manufacturing method. In addition, grain-oriented electrical steel sheets, which satisfy Conditions 1 to 4, do not satisfy at least one of Conditions 6 and 7 and do not include the glass film, were prepared as Comparative Examples 5 to 7. Furthermore, in the entirety of Present Example 9 and Comparative Examples 5 to 7, the average groove depth D was greater than 10 μm and equal to or less than 40 μm, the first angle θ1 was 0° to 50°, the second angle θ2 was greater than the first angle θ1 and was equal or less than 75°, and the groove width W was 10 μm to 250 μm.

The chemical composition of the steel sheets was the same as in Verification 1 of the rust resistance. As is the case with Verification 1 of the rust resistance, the assist gas spraying angle φ2 with respect to the laser scanning direction, the assist gas spraying angle φ3 with respect to the steel sheet surface, the flow rate of the assist gas 25, and the amount of particles in the sheet travelling atmosphere were appropriately adjusted in the ranges described in the embodiment so as to satisfy the Condition 6 and Condition 7.

Verification of the rust resistance was performed with respect to each of the grain-oriented electrical steel sheets corresponding to Present Example 9 and Comparative Examples 5 to 7 by using the same verification method as in Verification 1 of the rust resistance. As a result, as illustrated in Table 6, even in a grain-oriented electrical steel sheet that does not include the glass film, it was confirmed that the rust resistance of the grain-oriented electrical steel sheet was improved when employing a configuration satisfying Condition 6 and Condition 7.

TABLE 6

| | Ra (μm) | RSm (μm) | Rust resistance |
|---|---|---|---|
| Present Example 9 | 1.5 | 40 | Good |
| Comparative Example 5 | 1.3 | 7 | Poor |
| Comparative Example 6 | 0.8 | 4 | Poor |
| Comparative Example 7 | 0.6 | 7 | Poor |

INDUSTRIAL APPLICABILITY

According to the aspects of the invention, with regard to the grain-oriented electrical steel sheet in which the groove is formed in the steel sheet surface for refinement of the magnetic domain, it is possible to make the maximization of the iron loss reducing effect and the minimization of the decrease in the magnetic flux density be compatible with each other with good balance, and the bending characteristics are also excellent. Accordingly, the invention has sufficient industrial applicability.

BRIEF DESCRIPTION OF THE REFERENCE SYMBOLS

1: GRAIN-ORIENTED ELECTRICAL STEEL SHEET
2: STEEL SHEET
2a: STEEL SHEET SURFACE
3: GLASS FILM
4: INSULATING FILM
5: GROOVE
5a: FIRST GROOVE SURFACE
5b: SECOND GROOVE SURFACE
5c: GROOVE REGION
5d: GROOVE BOTTOM REGION
BL: GROOVE REFERENCE LINE
LWC: LONGITUDINAL GROOVE WAVING CURVE
SWC: TRANSVERSE GROOVE WAVING CURVE
RC: ROUGHNESS CURVE
D: AVERAGE GROOVE DEPTH
W: GROOVE WIDTH
X: ROLLING DIRECTION
Y: SHEET WIDTH DIRECTION
Z: SHEET THICKNESS DIRECTION

The invention claimed is:

1. A grain-oriented electrical steel sheet, comprising:
a steel sheet having a steel sheet surface in which a groove, which extends in a direction intersecting a rolling direction and of which a groove depth direction matches a sheet thickness direction, is formed,
wherein an average depth D of the groove is greater than 10 μm and equal to or less than 40 μm,
in a case where the groove is seen on a groove-width-direction cross-section that is perpendicular to a groove extension direction, when a center of the groove in the groove width direction is defined as a groove width center, a deepest portion of the groove deviates from the groove width center toward one side in the groove width direction, and a cross-sectional shape of the groove is asymmetric with respect to the groove width center as a reference in the groove width direction,
in a case where the groove is seen on the groove-width-direction cross-section, the groove includes a first groove surface and a second groove surface as a pair of inclined surfaces which are inclined toward the deepest portion of the groove from the steel sheet surface, and the groove width center is located on a second groove surface side when seen from the deepest portion, and
when an angle, which is made by a first groove end straight line obtained through linear approximation of the first groove surface and the sheet thickness direction, is defined as a first angle θ1, and an angle, which is made by a second groove end straight line obtained through linear approximation of the second groove surface and the sheet thickness direction, is defined as a second angle θ2, the first angle θ1 and the second angle θ2 satisfy following Conditional Expressions (1) to (3), $$0° < θ1 ≤ 50° \qquad (1)$$

$$θ1 < θ2 ≤ 75° \qquad (2)$$

$$θ2 - θ1 ≥ 10° \qquad (3).$$

2. The grain-oriented electrical steel sheet according to claim 1,
wherein in the steel sheet, a grain size of a crystal grain that is in contact with the groove is 5 μm or greater.

3. The grain-oriented electrical steel sheet according to claim 2,
wherein when the groove is seen on the groove-width-direction cross-section, a grain size of a crystal grain, which exists on a lower side of the groove in the steel sheet in the sheet thickness direction, is equal to or greater than 5 μm and equal to or less than the sheet thickness of the steel sheet.

4. The grain-oriented electrical steel sheet according to claim 1,
wherein when the groove is seen on a longitudinal groove cross-section including the groove extension direction and the sheet thickness direction, an arithmetic average height Ra of a roughness curve, which constitutes a contour of a groove bottom region of the groove, is 1 μm to 3 μm, and an average length RSm of a roughness curve element, which constitutes the contour of the groove bottom region, is 10 μm to 150 μm.

* * * * *